US012576489B2

(12) United States Patent
Vandenberg

(10) Patent No.: US 12,576,489 B2
(45) Date of Patent: Mar. 17, 2026

(54) PLUG TOOL AND RELATED METHOD OF USE

(71) Applicant: National Nail Corp., Grand Rapids, MI (US)

(72) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 483 days.

(21) Appl. No.: 18/200,779

(22) Filed: May 23, 2023

(65) Prior Publication Data

US 2024/0391074 A1 Nov. 28, 2024

(51) Int. Cl.
B25B 27/28 (2006.01)
B23P 19/12 (2006.01)
B25B 13/48 (2006.01)
B23P 19/02 (2006.01)

(52) U.S. Cl.
CPC .............. B25B 27/28 (2013.01); B23P 19/12 (2013.01); B25B 13/48 (2013.01); *B23P 19/025* (2013.01); *Y10T 29/49822* (2015.01); *Y10T 29/49945* (2015.01); *Y10T 29/53943* (2015.01); *Y10T 29/53952* (2015.01); *Y10T 29/53987* (2015.01); *Y10T 29/53991* (2015.01)

(58) Field of Classification Search
CPC ....... B25B 13/48; B25B 27/28; B23P 19/025; B23P 19/12; Y10T 29/49822; Y10T 29/49945; Y10T 29/53943; Y10T 29/53952; Y10T 29/53987; Y10T 29/53991
See application file for complete search history.

(56) References Cited

U.S. PATENT DOCUMENTS 714,989 A * 12/1902 Worthington ........... E21B 31/20
29/213.1
2,899,672 A * 8/1959 Lewis ...................... H01R 9/16
29/523
3,458,895 A * 8/1969 Miller .................... B29D 30/66
D8/31

(Continued)

OTHER PUBLICATIONS https://www.fastenmaster.com/products/cortex-for-decking, downloaded Sep. 29, 2023.

(Continued)

*Primary Examiner* — Jermie E Cozart
(74) *Attorney, Agent, or Firm* — Warner Norcross + Judd LLP

(57) ABSTRACT

A plug tool is provided that can retrieve, hold and/or install plugs in holes defined by a substrate such as a board. The tool can include a handle including an upper portion and a lower portion, a tube extending from the lower portion, the tube sized to receive a plug therein, and an ejector configured to eject a plug from the tube. A method of using the tool can include placing the tube over a plug having a plug face, a plug sidewall and a plug bottom such that the plug sidewall engages and is retained in the tube; moving the tool so that the tube is aligned with a hole defined by a recipient board, the hole bounded by a hole sidewall; and ejecting the plug from the tube so the plug sidewall engages the hole sidewall and is deposited in the plug hole.

17 Claims, 13 Drawing Sheets

(56) References Cited

U.S. PATENT DOCUMENTS

| | | | |
|---|---|---|---|
| 4,204,308 A * | 5/1980 | Marling | B25C 11/02 |
| | | | 81/53.2 |
| 4,788,894 A * | 12/1988 | Mitschele | B25B 13/50 |
| | | | 81/488 |
| 5,299,347 A * | 4/1994 | Decker | B25B 27/28 |
| | | | 29/235 |
| 7,367,768 B2 | 5/2008 | McGovern et al. | |
| 8,104,248 B2 | 1/2012 | Gillis et al. | |
| 9,597,785 B1 | 3/2017 | Gertner | |
| 2011/0239433 A1 * | 10/2011 | Hendren | B25B 31/00 |
| | | | 29/267 |
| 2017/0118972 A1 * | 5/2017 | Adkins | A01M 1/20 |
| 2018/0147707 A1 * | 5/2018 | Pauba | F16B 19/1081 |

OTHER PUBLICATIONS http://starbornindustries.com/pro-plug-pvc-product, downloaded Sep. 29, 2023.
https://www.woodcraft.com/search?q=plug+cutters&button=search, downloaded Sep. 29, 2023.
https://www.strongtie.com/hiddendeckfasteners_screwsandnails/dcuscrewplugsystem_productgroup_fss/p/deck-drive-dcu-screw-plug-solution, downloaded Sep. 29, 2023.

* cited by examiner

PLUG TOOL AND RELATED METHOD OF USE

BACKGROUND OF THE INVENTION

The present invention relates to plugs for filling holes in a substrate, and more particularly to a plug tool that can be used to capture, hold and/or install a plug into a hole in a substrate such as a board.

Many outdoor structures are constructed with wood or composite materials. One such outdoor structure is an outdoor deck. A deck typically includes deck boards, constructed from wood, composites and/or polymers. These deck boards are secured to an underlying support structure, usually including multiple joists, which are oriented transverse to the deck boards. Many times, the deck boards are secured to the joists with fasteners, such as screws, that are installed through the upper surfaces of the deck boards, and can be advanced downward, into the underlying joists. When fully installed, these "face screws" extend through the deck boards and at least partially into the underlying joists, securing the deck boards to the joists.

When a face screw is installed in a deck board, many times, a head of the screw penetrates into the upper surface of the board. This occurs as the screw is being advanced into the board. As the head penetrates the board surface, it produces a hole in the upper surface of the board, which remains above the fastener. Depending on how far into the deck board the head is advanced, the hole can be ⅛ inch to ½ inch in extreme cases. As a result, an upwardly opening hole can be seen when a viewer looks down at the upper surface of the board. Where the board is wood, the hole can be a somewhat ragged or splintered hole. Where the board is composite or polymeric, the hole can be a neat almost cylindrical shape, depending on how the board material deformed or was displaced by the head engaging the board as the screw was advanced into the board. In either case, these resulting holes can be unsightly, and aesthetically displeasing. Further, these holes can trap and retain precipitation or other liquids, or dirt and debris that impinge the deck. Where water enters the holes, it can freeze and therefore expand in the holes in the winter in Northern climates, which can damage the deck board surrounding the holes. Further, water that remains in the holes over time can in some cases rust the screws therein, or promote algae or other growth in the holes.

Accordingly, deck builders frequently try to plug such screw holes in the upper surfaces of deck board to protect the boards and enhance the finished deck appearance. This plugging can be achieved with small plugs, which are pounded with a hammer into the holes from above the holes to plug those holes. Many different deck builders and decking manufacturers use a variety of different plugs. For example, some deck board manufacturers, particularly composite or polymeric board manufacturers, offer plug system packets that include anywhere from 100 to 1000 plugs. These plugs are usually color coordinated to the various colors of deck boards that the manufacturer offers. Accordingly, when the plugs are installed in the holes in a deck board, the plugs are intended to match the color of the board well.

This, however, is hard to achieve, and many times, the plugs from a particular packet system will not match the actual boards installed on a deck because the materials from which the boards and plugs are constructed, are from different batches of raw materials. In such cases, the plugs can appear as an obviously different shade or hue, contrasting the surrounding board. This can draw an observer's view to the plugs, and sometimes leave the observer with an undesired perception of the quality or aesthetics of the deck. Further, where the boards and the plugs have a faux wood grain or surface texture, it is frequently difficult to pull a plug from a packet and match its grain with the grain surrounding the hole in the deck board. This can be due to the plugs coming from a different batch of boards, or simply made with a faux grain or texture that does not match the varying grain or texture of a stock deck board.

In addition, the handling and placement or installation of the plugs into a hole is tedious and time consuming. To install a plug in a hole in a board, a user manually grabs a plug and inserts it into the hole, pressing it slightly with their fingers to start the plug in the hole. The user then will take a hammer and lightly tap the plug into the hole to secure it in place. Sometimes, the plug will not perfectly fit the hole, so the user may need to remove a first plug and select a different plug to replace it. Other times, placement of the plug is less than perfect, and the plug deforms when pounded. Such deformed plugs may need to be removed to preserve the aesthetics of the board and finished surface of the deck.

Accordingly, there remains room for improvement in the field of deck board plugs, and in particular, in tools and methods to retrieve, hold and/or install plugs relative to holes in boards.

SUMMARY OF THE INVENTION

A plug tool is provided that can retrieve plugs, hold plugs and/or install plugs in holes defined by a substrate, such a board. The plug tool can include a handle including an upper portion and a lower portion, a tube extending from the lower portion, the tube sized to receive a plug therein, and an ejector associated with the tube and configured to eject a plug stored in the tube from the tube.

In one embodiment, the plug tool can include a plug ejector cap that is manually engageable to eject the plug from the tube and into a plug hole defined by a recipient board. The plug ejector cap can be joined with the ejector, which can be in the form of a rod. The user can manually engage the cap to move the rod and engage the plug, thereby ejecting and/or removing the plug from the tube, optionally into a hole defined by a recipient board.

In another embodiment, the plug tool can include a biasing element such as a spring that is associated with the ejector cap and or the ejector rod. The spring can bias the ejector rod from an extended mode back to a retracted mode. In the retracted mode, the rod can provide accommodating space within the tube to receive and/or hold a plug. In the extended mode, the rod can engage the plug and move it out from the tube.

In still another embodiment, the handle can include a height, a width, and a length. The height, which can extend from the lower portion to the upper portion, can be sized to enable to handle to be grasped by a hand of a user to manipulate the plug tool. The length can span between a forward portion and a rearward portion, along a tool length axis that can generally bisect the tool. The length can be sized to fit within a user's hand, so that a rear portion of the handle engages a web of the user's hand between a pointer finger and thumb, while a front portion engages the pointer finger at a knuckle near a distal end of the finger. The width can span between a first side and a second side of the handle.

In even another embodiment, the length of the handle, or tool length, which spans along a tool length axis, can be used to specifically orient the plug tool relative to a board, such as a donor board from which a plug is produced, or a recipient board, in which the plug is placed or installed via the plug tool. The length can be greater than the width of the tool or handle.

In a further embodiment, a method can be provided. The method can include placing a tube of a tool over a plug having a plug face, a plug sidewall and a plug bottom such that the plug sidewall engages and is retained in the tube; moving the tool so that the tube is aligned with a hole defined by a recipient board, the hole bounded by a plug sidewall; and ejecting the plug from the tube so that the plug sidewall engages the hole sidewall and is deposited in the plug hole to conceal a fastener securing the recipient board to a substrate.

In still a further embodiment, the method can include inserting the tube in the hole; and pushing the plug from the tube with a pusher so that the plug enters the hole.

In yet a further embodiment, the recipient board includes a recipient board face. The tube can be inserted into the hole so that a lower tube end is located below the recipient board face. The ejecting step can occur so that the plug sidewall engages the hole sidewall below the lower tube end, and below the recipient board face.

In even a further embodiment, the method can include removing the tube from the plug and moving the tool away from the recipient board. The plug face can remain above the recipient board face. In this condition, the plug further can be pounded into the hole with a tool such as a hammer so that the plug face is flush with the recipient board face.

In another embodiment, the tool and method can be used with a recipient board and/or a donor board, which can be a wood, synthetic, polymeric and/or composite deck board, having a real or faux wood grain. In this application, the board can include a board grain axis along which a majority of the real or faux wood grain, texture and/or surface treatment, extends.

In still another embodiment, the method can include orienting a plug face grain with the tool length and/or a corresponding tool length axis, and capturing the plug in the tube. A user of the tool grasping the handle can manipulate the tool and handle to orient the tool length and thus the plug face grain relative to a board grain axis of a recipient board.

In yet another embodiment, the method can include rotating the tool so that the tool length is oriented parallel to the board grain axis before ejecting a plug or capturing a plug. In this manner, the plug face grain and the board face grain can be aligned, for example parallel or contiguous with one another.

In even another embodiment, the tool can be used to extract, remove or capture a plug produced from a donor board. The donor board can be similar in color, texture, face grain, contour, or other physical characteristics to a recipient board. In this manner, the plug can have a higher probability of matching the recipient board when the plug is installed relative thereto.

In a further embodiment, the method can include installing the tube within a donor board groove defined by a donor board to circumscribe the plug with the tube. The handle can be moved or reoriented relative to the groove to disassociate the plug from the donor board. The tool, with the plug engaging the tube, can be removed from the donor board and moved to another location nearby a recipient board.

In still a further embodiment, the method can include tilting the tube so that a bottom of the plug bottom breaks loose from the donor board; and removing the plug from a donor hole defined by the donor board, the donor hole having a diameter greater than a plug diameter of the plug at the plug face.

The current embodiments provide a tool and related method can efficiently and quickly capture, retain and/or install a plug relative to board, for example, a deck board or other workpiece. The tool can be used to retain, hold and transfer a plug to a plug hole, and quickly and efficiently insert the plug into that plug hole. In some cases, the tool can insert the plug in the hole a sufficient distance so that only minor pounding is required to completely install the plug so the plug face is flush with the board face. Where the tool is used on a job with boards or substrates constructed to include a generally uniform surface texture, color or other aesthetic element, the tool can be used to remove a plug from a donor board and install the plug in a hole defined by a recipient board. As a result, the tool can remove aesthetically matching plugs from scrap donor boards and can install those plugs in fastener holes defined by recipient boards. This can minimize wasted scrap, and/or otherwise repurpose the scrap for manufacture of plugs on a jobsite. Where the boards and scrap are from the same manufacturing batch from a supplier, the likelihood of closely and/or perfectly matching the plugs with the boards can be maximized. As a result, a finished deck constructed with the plugs can more pleasingly and thoroughly aesthetically match the deck boards surrounding the fastener holes into which the plugs are installed.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
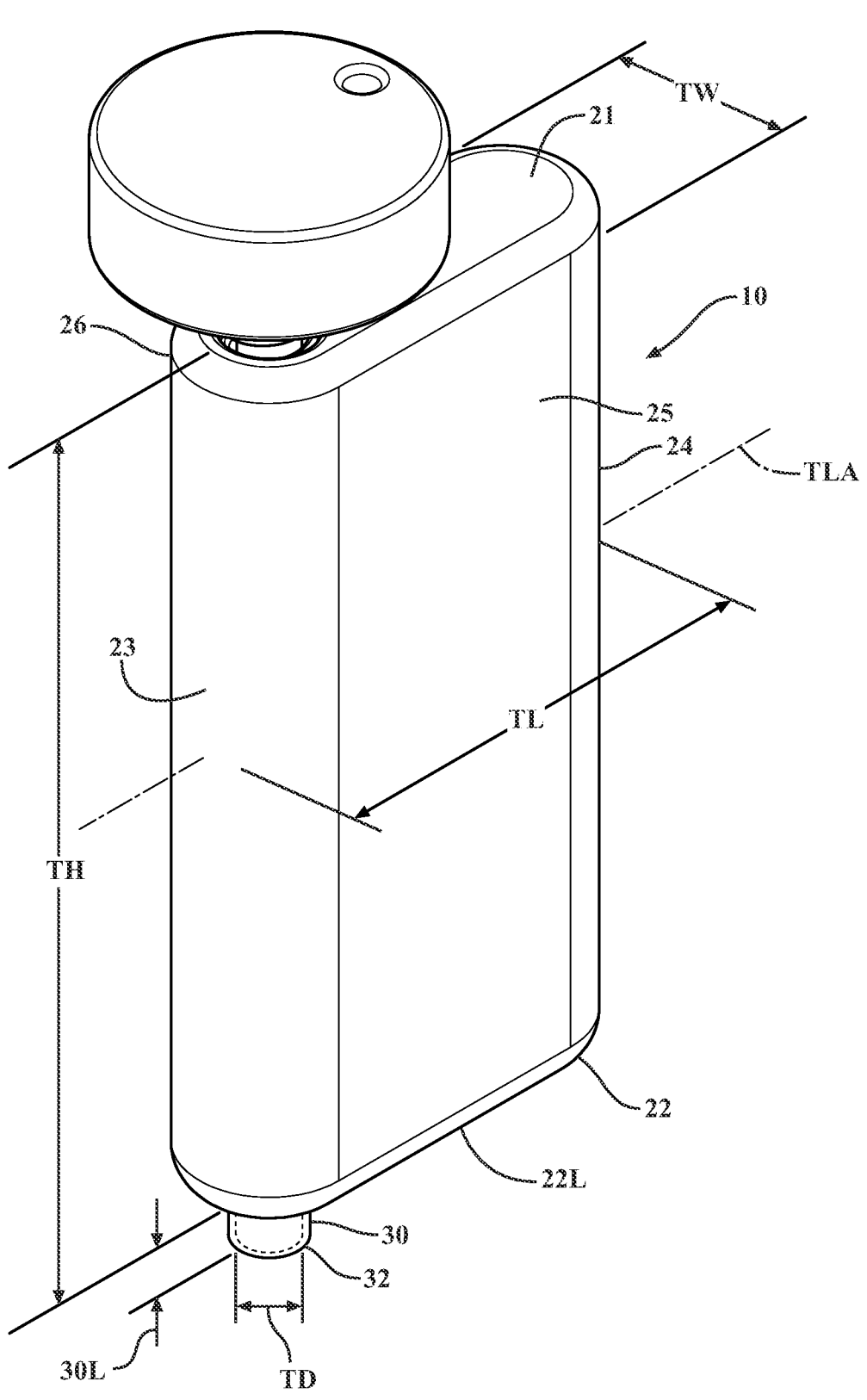
FIG. 1 is a perspective view of the plug tool of a current embodiment.

A current embodiment of the plug tool is shown in FIGS. 1-5 and generally designated 10. The tool 10 as mentioned above can be configured to retrieve, hold and install plugs 100 relative to holes 100H in substrates such as recipient boards RB or donor boards DB or scrap as shown in the figures. As generally shown, the tool 10 can include an elongated handle 20 including an upper portion 21 and a lower portion 22, a tube 30 extending from the lower portion 22, and an ejector rod 40. The tube 30 is sized to receive, retain and/or eject a plug 100. The ejector rod 40 can be aligned with the tube and configured to eject the plug, when stored or retained in the tube, from the tube.

While suited for a variety of applications, the plug tool can be used to retrieve, store, retain and/or install plugs. In the embodiment shown, the plug tool 10 can be used to retrieve a plug 100 that has been produced by a particular plug cutting tool and methods as disclosed in co-pending U.S. application Ser. No. 18/200,959, filed on May 23, 2023, entitled Bladed Plug Cutting Tool and Related Method of Use and U.S. application Ser. No. 18/200,968, filed on May 23, 2023, entitled Plug Cutting Tool and Related Method of Use, which are hereby incorporated by reference in their entirety. The exemplary plug shown in FIG. 2 initially can be connected or joined with a donor board DB. The plug can include a plug longitudinal axis PLA which extends orthogonally from a plug face 100 PF of the plug 100. The donor board DB can include a plug perimeter groove DBG around the plug 100. The plug 100 can include a plug face or outer exterior surface 100 PF which is generally visible when the plug is joined with the donor board DB or installed relative to a hole defined by a recipient board RB as described below.

Figure 3:
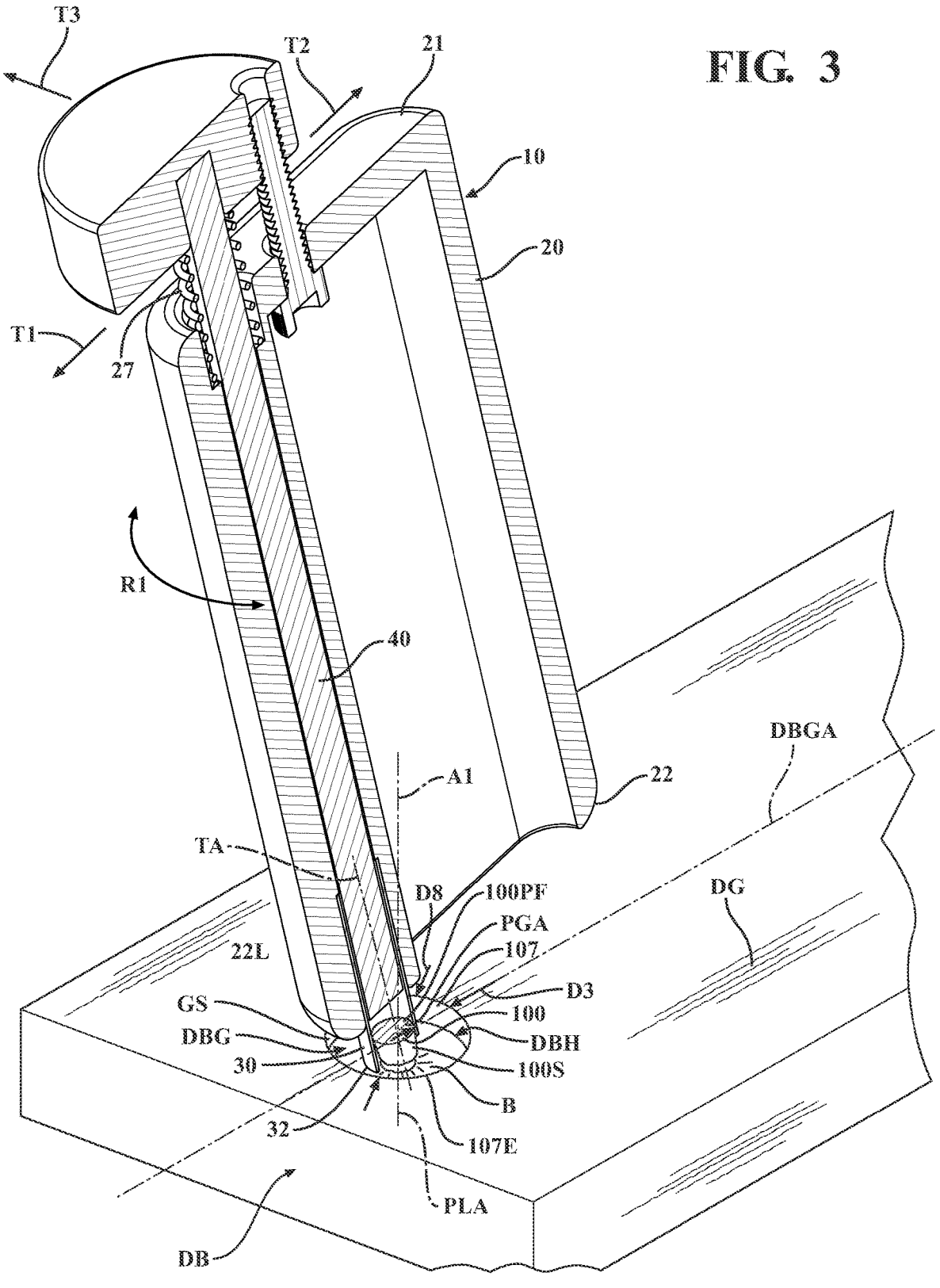
FIG. 3 is a section view of the plug tool engaging and/or capturing a plug, while tilting the plug tool to remove the plug from a plug hole in a donor board.

Generally, the plug tool 10 can be installed such that the plug 100 extends into or is at least partially surrounded by the tube 30. The tube can include a tube axis TA that can be generally aligned with a plug longitudinal axis PLA upon engaging the tube with the plug. As this occurs, the tube can slide or move over the plug, such that the plug is inserted into the tube. The tool and handle can be tilted as shown in FIG. 3 so as to break off, dislodge or generally disassociate the plug 100 from the donor board DB. In so doing, the tube axis TA can be tilted or offset at one or more angles A1 from the plug longitudinal axis PLA, which as shown in FIG. 3, is the original plug longitudinal axis PLA before the plug is broken or disassociated from the donor board DB. This angle A1 may be at least 1°, at least 2°, at least 3°, at least 4°, at least 5°, at least 10°, at least 20° or other angles. Further, the tube and handle can be rotated in directions R1 or tilted in directions T1, T2, T3, etc. about the plug longitudinal axis in an effort to dislodge or disassociate the plug from the donor board DB.

Figure 4:
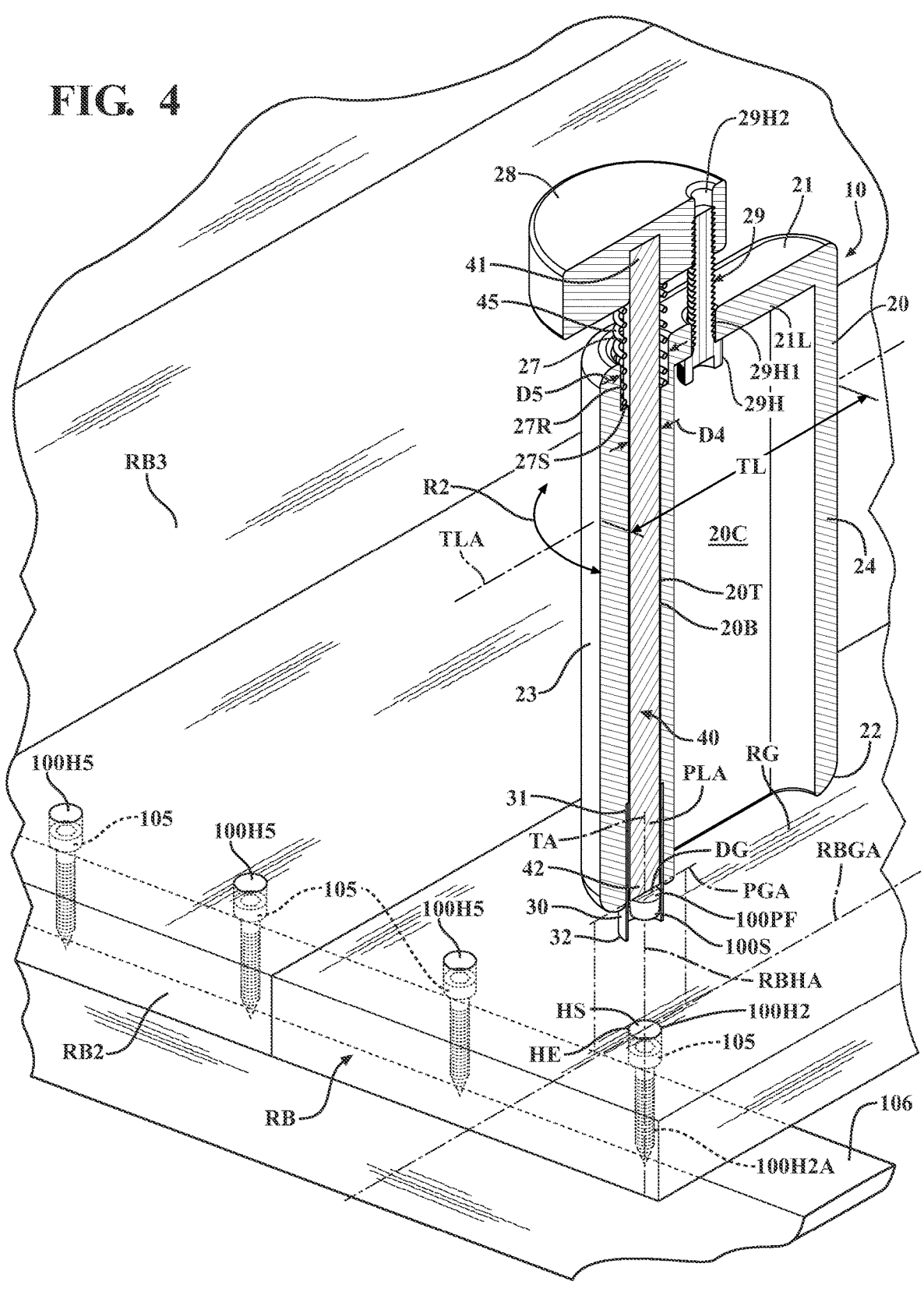
FIG. 4 is a section view of the plug tool with a rod in a retracted mode before an extended mode of the rod to install the plug relative to a hole in a recipient board.

After the plug is disassociated from the donor board DB, the user can move the tool while the plug 100 is retained in the tube 30 as shown in FIG. 4 and align the plug longitudinal axis PLA with the recipient board hole axis RBHA that extends from the recipient board plug hole 100H2. The user can install the plug in the hole 100H2 with the tube as described below. The user can align the tool length or tool axis TLA with the recipient board grain axis RBGA by moving or rotating the axis TLA in directions R2 about the tube axis TA or plug axis PLA. In so doing, the plug grain axis PGA of the plug grain PG on the plug face 100PF can also be well aligned with the recipient board grain axis RBGA so that the plug 100 melds and is visually indistinguishable from and further aligned with the remainder of the recipient board face RBF and the grains RG on that board.

Upon such alignment, the plug 100 can be further installed if suitable in the hole 100H2 of the recipient board RB, optionally being pounded or forced into that hole 100H2 so that the plug effectively plugs that fastener hole, above the optional fastener 105 such that there appears to be continuity and/or a smooth and perhaps unnoticeable aesthetic transition between the plug and the workpiece. This process can be repeated for multiple fasteners 105 and fastener holes 100H5 in multiple workpieces or boards as shown in FIG. 4.

Of course, as will be appreciated, the plug tool alternatively can be used with premanufactured plugs 100 that are independently formed or produced, and provided in a packet of multiple such plugs. In this case, removal of a plug from a donor board is not part of the process. In such cases, a plug 100 can be simply installed in the tube manually by a user, with the plug face 100PF having the plug grain PG facing upwards inserted first into the tube. The plug longitudinal axis PLA can be generally parallel to the tube axis TA in this process. The plug may or may not extend outward slightly from the lowermost edge 32 of the tube, in this instance or the instance where the plug is removed from a donor board.

The environment, boards and plugs with which the plug tool 10 of the current embodiment optionally can be used will now be described in more detail. Turning to FIGS. 1-4, the current embodiment is described in connection with the construction of a deck having one or more recipient boards RB, RB2 etc. that are secured with fasteners 105 to one or more underlying support structures 106, which optionally can be in the form of joists, beams or member; however, the embodiments herein are well suited for a variety of other types of substrates and plugs to produce plugs from those substrates. As used herein, a board or substrate can refer to any work piece constructed from any type of material, such as wood, polymers, composites, metal, synthetic materials or the like. The substrate or board can include a thickness, an outer aesthetic surface and/or a texture, where one or more plugs can be extracted from the same using the tools and methods described herein.

Figure 2:
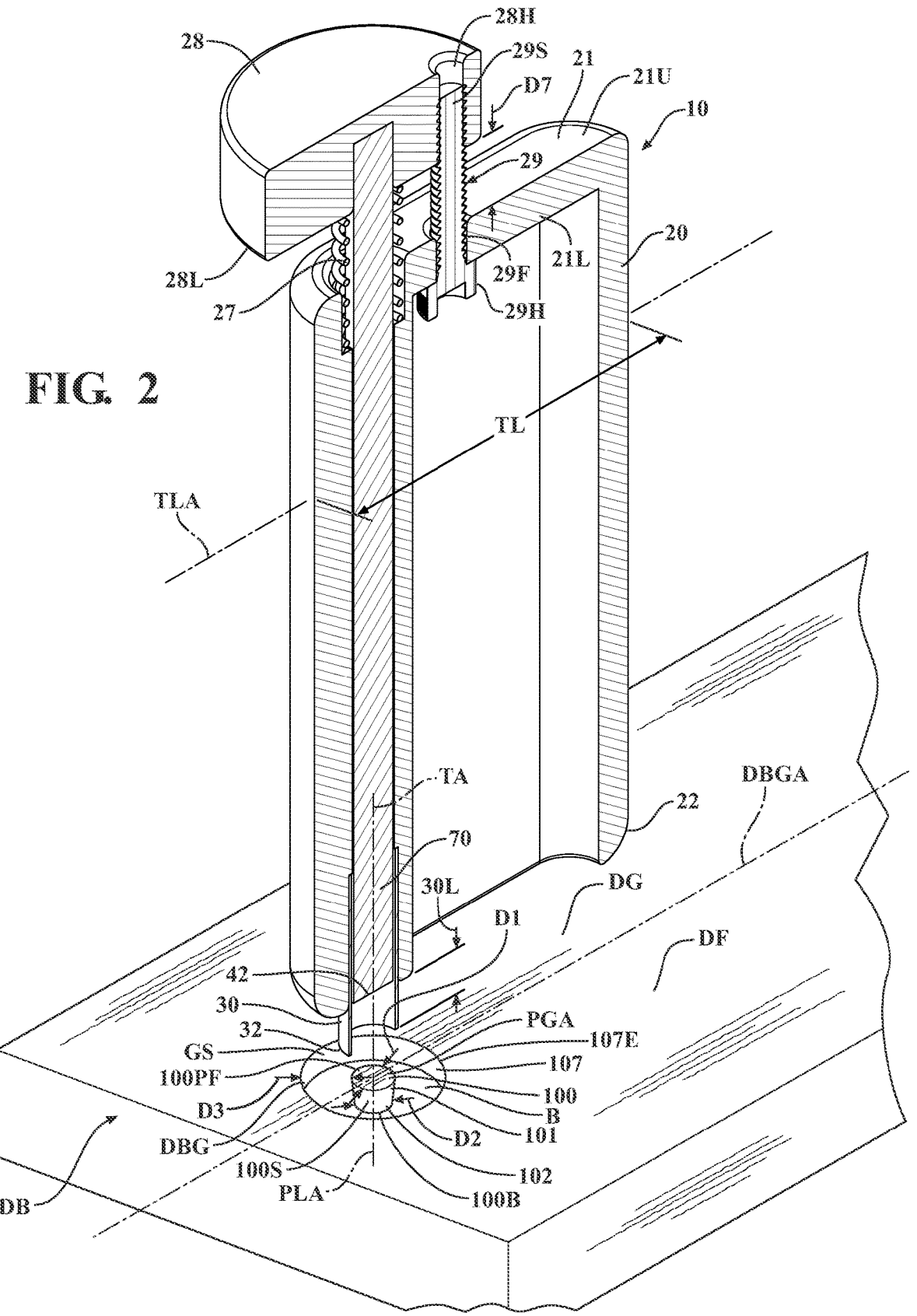
FIG. 2 is a section view of the plug tool about to engage a plug in a donor board.

As shown in FIGS. 2 and 3, a board, such as a donor board DB or recipient board RB can each include a particular grain DG or RG, respectively as shown. These grains, and any grain mentioned or described herein, can be or can mimic a natural or synthetic wood grain and/or can be in the form of a texture, design, image, color gradient or transition, printed pattern, structural pattern, surface treatment, contour, ridges, projections, recesses, undulations or other surface or cosmetic features whether two dimensional or three dimensional. Optionally, the grains can be associated or aligned with each board along an axis, such as the donor board grain axis DBGA or the recipient board grain axis RBGA. These axes optionally can correspond to the direction in which a portion and/or a majority of the grains of the respective boards extend along the length or other dimension of the boards.

Optionally, the donor board DB can be in the form of a piece of scrap cut, removed or disassociated from one or more of the other boards in the deck being constructed from recipient boards. Thus, the plug 100 can be removed from that scrap donor board DB, which can be from the same batch, materials and aesthetics as the recipient boards RB, RB2, etc. or other structures. In some cases, the donor board can be removed from a recipient board and form scrap. Where the boards are deck boards, those deck boards can form a deck. Accordingly, where the plugs are removed from the donor boards, which can be highly similar to the recipient boards or formerly forming parts of one or more recipient boards in a deck or other structure, there can be a high probability that the plugs 100 can include a plug face 100PF having a grain as described herein, and/or color, hue or other aesthetics, that can precisely and/or closely match the recipient board grain RG, color, hue, or other aesthetics of the recipient boards RBs in which the plugs are installed. Accordingly, plugs produced from the scrap can match well the surfaces of the recipient boards RB, RB2, etc. This good, near and/or exact match can offer a clean and aesthetically pleasing, uninterrupted surface for each of the respective boards and thus the deck or other structure built with the boards and plugs using the plug tool and methods of the current embodiment.

The plugs 100 as described herein can include a plug face 100PF as shown in FIG. 2. The plug face can include a plug face grain PG, which optionally can be aligned along a plug grain axis PGA. The plug face can include a plug longitudinal axis PLA that runs through or intersects the plug face 100PF, optionally being perpendicular and/or orthogonal to the plug face. The plug can also or alternatively include a color, hue or other aesthetic, which can be configured to match or have some other relationship with the donor board and/or the recipient board. The plug can include an upper portion 101 and a lower portion 102. The upper portion can include the plug face 100PF. The lower portion 102 can include a plug bottom 100B. The upper portion and plug face optionally can be round or circular as shown, or can be of other shapes depending on the application.

The plug can include a plug sidewall 100S extending from the upper portion to the lower portion. This sidewall can be tapered as shown, such that the diameter or dimension D1 of the plug at the plug face is greater than the diameter dimension D2 of the plug at the plug bottom. The plug can be of a partially frustoconical shape, with a generally flat or planar plug face, optionally including a grain or texture as described herein, and a bottom 100B that can be somewhat planar, or can have some irregularities, bumps, and/or jagged parts or projections due to the bottom of the plug 102 having been separated from the donor board. The plug can optionally be of a greater dimension at the plug face, including the texture or grains that are a continuation of the donor board grains, than at the bottom of the plug. Of course, in other cases, the plug sidewall can be cylindrical, stepped, concave, convex or other contours depending on the application.

In the embodiment shown, the plug 100 can be produced from a donor board DB. The plug face 100PF can be continuous with the exterior board surface or board face of the donor board DB. The plug face can include the plug grain PG which can be part of or separated from the recipient board face. The plug grain can be formerly a part of the donor board grain DG. The plug grain PG can lay along or be aligned with a plug grain axis PGA. This plug grain axis can be aligned or parallel with the recipient board grain axis RBGA, with the plug grain PG and donor board grain DG once having been connected, contiguous or otherwise associated with one another.

A shown in FIG. 2, the plug can be formed from the donor board DB, with another tool. The plug 100 can be surrounded by a donor board groove DBG before removal. This donor board can include a bottom B that is initially joined with the plug bottom 100B until removal using the plug tool 10. The donor board groove can circumscribe the plug 100 while the plug is still attached to the donor board. The donor board groove DBG can include a donor board groove sidewall GS that is separate and distal from the plug sidewall 100S. The donor board groove sidewall GS optionally can be cylindrical, while the plug sidewall 100S can be tapered or noncylindrical. The plug face can be separated a distance D3 from the donor board face DF by the groove DBG. Optionally, this distance D3 can be at least 0.05 inches, at least 0.10 inches, at least 0.15 inches, at least 0.20 inches, between 0.05 and 0.25 inches, inclusive, between 0.10 and 0.20 inches, or other distances depending on the size of the plug and the plug groove or donor board groove. The outer perimeter of the plug face 100PF can be round or circular, as can be the perimeter of the groove where the donor board face DF ends around the groove. At this location, the donor board groove DBG can include an upper perimeter 107 and upper perimeter edge 107E, which can either or both form a bearing surface when a plug cutting tool is articulated or tilted relative to the plug longitudinal axis PLA to taper the plug sidewall 100S from the upper portion to the lower portion. When the upper perimeter edge 107E and/or upper perimeter 107 forms a bearing surface, a rotating portion of a plug cutting tool (not shown), which can generally be of a cylindrical shape, with no cutting edges in that region, can bear on and rotate or slide relative to that edge or perimeter, without cutting into, removing or gouging the perimeter edge 107E and/or the perimeter 107. Of course, in some cases, the rotating portion may frictionally engage and/or slightly melt that edge and/or perimeter.

Returning to FIGS. 2 and 3, the plug 100 and plug bottom 100B also can be integrally formed with, and or can form a part of, the donor board DB until the plug is separated from the donor board DB using the tool 10 described herein. For example, the plug can extend upward from the bottom B of the groove DBG. The plug can be constructed from the same material as the bottom of the groove, and can be integrally and homogeneously formed with the portion of the donor board DB under the plug. For example, where the donor board and plug are formed from a composite or plastic, the composite or plastic material can extend upward contiguously and continuously from the material underlying the plug and into the plug itself. The plug of course can be surrounded by the plug sidewall 100S, which can transition to the groove bottom B at the lower portion of the plug, and can transition to the plug face 100PF at the upper portion of the plug 100. The plug sidewall, as noted above, however, might not include the grains or other contours of the plug face, due to that feature being formed from the cutting edges of a plug cutting tool.

The structure, components and features of the plug tool 10 of the current embodiment will now be described in more detail. Turning to FIGS. 1-3, as mentioned above, the tool can include an elongated handle 20, a tube 30 disposed in or relative to the handle, and a ejector rod or pin 40. The tool handle 20 can comprise a tool length TL extending along a tool length axis TLA that extends from a forward portion 23 to a rearward portion 24. The elongated handle can include a first side 25 and a second side 26 separated by a tool width TW. The elongated handle upper portion 21 can be separated from the lower portion 22 by a tool height TH. The tool length can be greater than the tool width. The tool height can be greater than the tool length and the tool width. The handle can be of a rounded or elliptical shape so that a user can easily and comfortably grasp the user's hand around the forward portion and rearward portion to manipulate the handle and thus orient the tub 30 in a predetermined orientation relative to a plug 100 and/or a hole 100H2 in a recipient board to place the plug therein.

The handle 20, as shown, can include a primary cavity or compartment 20C that extends from the upper portion 21 to the lower portion 22. The cavity 20C optionally can be open at the lower portion 22 to the environment. The handle 20 also can include a tubular portion 20T or compartment that extends from the upper portion 21 to the lower portion 22. This tubular portion 20 can define a tubular bore 20B extending therethrough, from the upper portion to the lower portion. The tubular bore can generally slidably and reciprocally house the rod or bar 40. This rod 40 can be used to engage a plug 100 when the plug is engaged with tube 32 as described below. The handle 20 optionally can be constructed from a polymer, composite, metal, or other materials depending on the application.

The handle 20 can be joined with the tube 30. As shown in FIG. 1, the tube 30 can extend from the lower portion 22 of the handle by tube length 30L. This tube length 30L optionally can be equal to, less than, or greater than the overall plug height PH of a plug 100 as shown in FIG. 2. As shown, the tube 30 optionally can extend from the bottom of the handle 22 a length 30L which can be equal to or greater than the plug height PH so that the tube can be satisfactorily disposed over the plug, such that the lower or lower most portion or lower most edge 32 of the tube 30 can engage the bottom of the donor board groove or can come close enough to it, to satisfactorily surround the plug for extraction from the donor board as described below.

Optionally, as shown, the tube can be of a cylindrical shape, or of other shapes depending on the plugs with which the tool is used. The tube as shown can generally be configured to at least partially or fully surround a part of the plug when the tube is engaged with and/or installed relative to the plug. Although shown as a continuous sidewall tube, the tube can include multiple sidewalls, joined at corners or other transitions to one another. The tube also optionally can include multiple openings, slots or recesses extending upward from the lower edge or portion 32, such that the tube comprises multiple teeth, rails or prongs. As shown, the lower edge of the tube can be a continuous edge, but of course can be interrupted, discontinuous and/or jagged.

The tube 30 as shown in FIG. 4 can include the lower end or edge 32 which extends to the upper end or edge 31. Lower edge 32 can be beveled or planar depending on the application. Where beveled, the lower edge can allow or facilitate the insertion of the tube 30 into a hole defined by a recipient board, for example as shown in FIG. 4. The tube can be secured within a portion of the tubular portion 20T of the handle, and can be coextensive with the bore 20B. Optionally, the tube can extend only a small distance of less than an inch or so into the handle to conserve the material from which the tube is constructed. For example, the tube can be constructed from a rigid, durable, wear resistant material, such as a metal (e.g., steel) to assist in forcing the tube over the plug and inserting the tube into a recipient hole 100H2. The metal tube might be molded over, adhered and/or friction fit within the handle 20 and/or the bore 20B of the tubular portion. The exact amount of the extension into the tubular bore can vary, but can be sufficient to withstand the rigors of tilting, leveraging and/or moving the tube to break off or disassociate a plug from a donor board and/or to lodge or insert a plug into a hole of a recipient board without breaking the tube from the handle or otherwise compromising the structural integrity of the plug tool.

The tubular portion and the bore can extend to the upper portion 21 of the handle. There, a biasing element 45 can be disposed adjacent a shoulder 27S that forms a bottom of the recess 27R. The biasing element optionally can be in the form of a coil spring that extends into the recess 27R and abuts the shoulder 27S. The coil spring can be coiled around the rod 40 as shown. In other applications, other springs, such as leaf springs or elastomeric elements can be adjacent the rod, and can generally be used to move the rod between a retracted, normal mode shown in FIG. 4 and an extended, plug dispensing mode shown in FIG. 5 and described below. Of course, these modes can be reversed, and/or the rod can be stationary as with the embodiments described above where the tube, rather than the rod moves to eject a plug from the tool. The coil spring 25 can extend to and engage an optional plug ejector cap 28 located optionally above the handle. This cap, of course, can be located elsewhere on the handle or tool in general, and can alternatively be in the form of a trigger or other actuator, or can be deleted from the tool, such that a user directly engages the rod. As shown, however, the cap 28 can be joined with and can move the rod 40. The cap can be molded, adhered, screwed to or fixed with a pin or other structure to the rod. The cap can form an interface for a user to manually engage ejector rod 40 and thereby eject a plug 100 from the tube 30, for example, into a plug hole 100H2 as described below.

Figure 5:
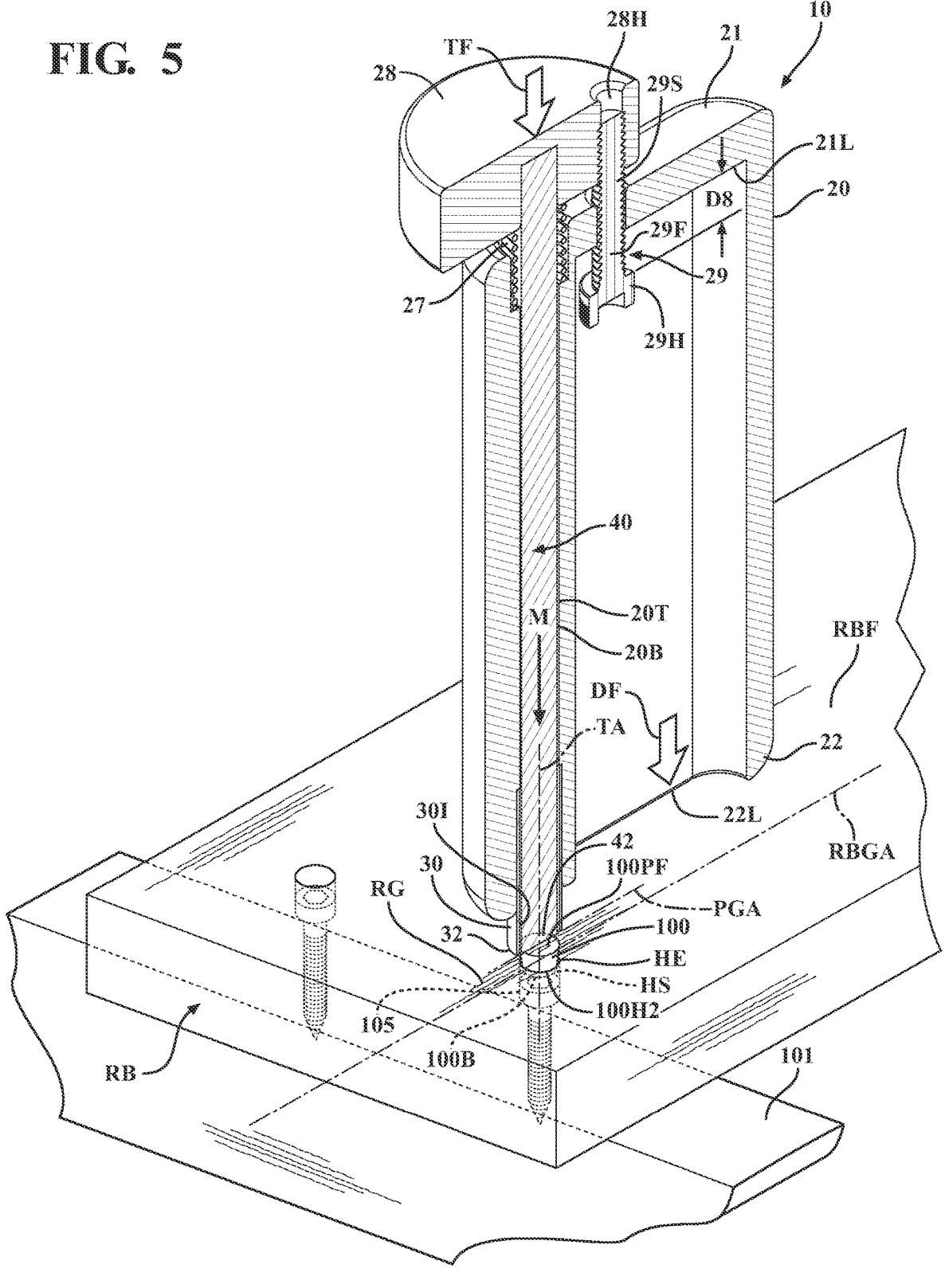
FIG. 5 is a section view of the plug tool with the rod in an extended mode installing the plug relative to a hole in a recipient board.

The cap 28 can be of a round or other configuration as shown, and can be engaged by a user while the user grasps the handle 20. For example, the cap can be placed so a user can use their thumb to press the cap while grasping the remainder of the handle with their hand and other digits. When the cap is depressed with force TF from a user's thumb, for example, as shown in FIG. 5, the spring 27 can depress or compress, and the rod 40 can move within the tube bore 20B of the tubular portion 20T. When this occurs, the rod lower portion 42 engages the plug face 100PF and/or the plug 100 in general to move the plug out from the lower portion of the tube 32 and generally out from the tube 30. Where the tube lower portion 32 is installed in a hole 100H2 of a recipient board, the plug can be installed in that hole upon the ejection from the tube.

The tool 10 optionally can be outfitted with a limiter 29 which can limit the movement of the plug ejector cap 28, and thus the overall extension and retraction of the rod 40 relative to the tube 30 and the tubular bore 20B. This limiter 29 optionally can be in the form of a fastener 29F which can include a head 29H and a shaft 29S. The shaft 29S can be threaded into a corresponding bore or hole 28H that is defined by the ejector cap 28. The fastener 29F can be accessed through an opening in the lower portion of the internal compartment 20C of the handle 20. The fastener 29 can be tightened relative to the hole 28H defined by the cap to set the overall movement of the rod relative to the tube and thus the rod's effect on movement, such as ejection, of the plug 100 from the tube. The fastener 29 can be set as shown in FIG. 2 to set a distance D7 between a lower surface 28L of the cap 28 and the upper surface 21U of the upper portion 21 of the handle 20. This distance D7 can correspond to a satisfactory compression and/or extension of the spring 27 that engages the cap 28, to thereby hold the ejector rod lower portion 42 in a predetermined location within the tube 30. The fastener 29F can be threaded into the hole 28H to alter the distance D7 and thus provide a different compression of the spring 27. In turn, this can change the location of the lowermost portion 42 of the rod 40 relative to the tube and thus to a portion of the plug. By tightening or loosening the fastener 29F relative to the hole 28H the user can adjust the ejector rod and its position relative to the tube 30.

When the plug injector cap is in a neutral mode, in which the ejector rod 40 is in a retracted mode, for example as shown in FIG. 2, the head 29H can engage a lower surface 21L of the upper portion 21 of the handle 20. This in turn sets the maximum distance D7 of the cap from the upper surface 21U and thus the overall extension of the spring 27 and the position of the cap 28. When a user depresses the ejector cap 28, for example, with a force TF as shown in FIG. 5, the ejector cap moves downward, toward the handle. The spring 27 compresses and the rod 40 attached to the cap 28 moves with the cap and slides or extends in the bore 20B. The lower portion 42 of the rod 40 engages or further engages the plug 100, in particular the plug face 100PF. As this occurs, the plug can be ejected or pushed out from the tube 30, exiting the lower portion 32 of the tube and into a hole 100H2 as described further below. Optionally, the lower end 42 of the rod can extend below or beyond the lower surface 22L of the handle, and can extend in some cases into the area previously occupied by the plug 100 within the tube interior 30I. The lower end of the rod 42 further optionally can extend in some cases below the receiving board face RBF upon full extension thereof.

As the cap 28 moves downward under the force TF, the limiter 29 can move with the cap. In so doing, the head 29H of the fastener 29F can move a distance D8 away from the lower surface 21L of the upper portion 21 of the handle. After the plug 100 is ejected from the tube 30, and the force TF is removed, the rod 40 retracts back to the retracted mode, for example, as shown in FIG. 2 or 4, until the head 29H engages the lower surface 21L to again limit or stop the movement of the cap 28 away from the upper portion 21 of the handle, under the force of the spring 27. Optionally, the fastener 29 can further move relative to the upper portion 21 within the hole 29H defined by the upper portion 21 of the handle 20.

A method of using the plug tool of the current embodiment will now be described in more detail. Turning to FIGS. 2-7, the tool can be used to install a plug 100 relative to a hole 100H2 defined by a recipient board RB, which hole can be defined above a fastener 105 holding the board to an underlying support or joist 106. Optionally, the plug can be retrieved from a packet of plugs provided in a batch of plugs, with the intent of matching the color, hue, grain and other aesthetic features of the recipient board or boards, and installed in the tube 30 of the tool 10, with the grains or plug face facing up. The tube can be installed in the uppermost portion of the hole with the tube 30, and ejected from the tube by depressing the cap 28 and moving the rod 40 to engage the plug and force or deposit it in the hole of the recipient board RB. On a high level, the method can generally include placing a tube of a tool over a plug having a plug face, a plug sidewall and a plug bottom such that the plug sidewall engages and is retained in the tube; moving the tool so that the tube is aligned with a hole defined by a recipient board, the hole bounded by a hole sidewall; and ejecting the plug from the tube so that the plug sidewall engages the hole sidewall and is deposited in the plug hole to conceal a fastener securing the recipient board to a substrate.

The method optionally can include the retrieval of one or more plugs from a donor board and subsequent placement and installation of the plugs in a recipient board as described generally above and further here. In this method, the tool 10 can be used as follows. The tool 10 can be moved toward the donor board DB as shown in FIG. 2. This donor board DB can include the above noted donor board face DF and a donor grain DG. The donor grain DG can be the particular grain that is aligned along the length of the board, and can be generally parallel to or aligned with a donor board grain axis DBGA. As mentioned before above, the donor board DB can be a piece of scrap material, for example, obtained from one or more recipient boards RB. Accordingly, the grain of the donor board can perfectly match or at least match very well the grain, hue, color, and other physical attributes of the recipient boards within which a plug from the donor board is installed. The tool can be oriented such that the tool length TL and/or the tool length axis TLA is generally aligned with the donor board grain axis DBGA as well as the plug grain axis PGA which can be parallel to the donor board grain axis DBGA. The tool can be moved downward such that the tube 30 is aligned with the plug 100 and the plug face 100PF. The tube internal dimension of diameter TD can be the same as or of a greater dimension than the dimension D1 of the plug at the plug face. The tube lower edge 32 can be placed over the plug and can slide downward, below the exterior or face surface DF of the donor board DB. As it does, the tube sidewall 30S can slide along the plug side wall 100S moving toward the bottom 100B of the plug and toward the bottom of the donor board groove DBG. As this occurs, the lower portion 32 of the plug passes by the plug face 100PF, and becomes disposed a distance below the plug face and the donor board face DF.

The tube 30 can continue to be pushed downward over the plug and optionally can frictionally engage the plug sidewall 100S of the plug. Optionally, the lower surface 22L of the handle optionally can engage the donor board face DF to cease or arrest movement of the tool downward, and particularly the tube moving downward over the plug. The tube 30 at this point can extend partially above the plug face and below the plug face, with the lower portion 32 of the tube being disposed adjacent the bottom B of the plug donor board groove DBG. As the tool and tube moves toward the donor board DB, the tube axis can be aligned with and optionally parallel to and/or coincident with the plug longitudinal axis PLA. As the tube moves downward over the plug, eventually, the lower portion 42 of the ejector rod 40 optionally can engage or come close to the plug face 100PF of the plug when the tool is installed relative to the donor board DB and the plug 100. The plug can be installed in the tube a preselected distance so that the plug face optionally engages the lower end 42 of the ejector rod, or is a few millimeters away from it. The plug optionally can be fully installed relative to the tube so that the entire plug height PH is within the tube, and the plug bottom 100B is adjacent the lower end or lower edge of the tube 32. The tube optionally can surround, circumscribe or otherwise be placed against the plug and the sidewall thereof. In some cases, the plug bottom or plug lower portion may extend a slight distance below the bottom of the lower tube end 32, and might be gapped a small amount from the rod face 42. The plug also might be tilted slightly within the tube and the plug axis offset a slight angle from the plug longitudinal axis upon initial installation of the plug in the tube, or the tube relative to the plug in the donor board.

Optionally, the tube 30 can snugly fit against the plug side wall 100S such that when the tool 100 is moved away from the donor board face DF, the plug can break free from the donor board DB, and can be removed from the donor board groove DBG. In this case, a donor board hole DBH can be formed from the space where the plug 100 was once located, and including the donor board groove DBG. This donor board hole DBH can comprise the outer most dimension of the donor board groove DBG, and can be bounded by the groove sidewall GS, the groove bottom B, the area where the plug bottom 100B once was attached to the board, and the perimeter and/or perimeter edge of the groove. The diameter D8 of the donor board hole DBH can be greater than the diameter D1 of the plug 100 at the plug face 100PF.

Returning to FIG. 3, before removal of the plug 100 from the donor board DB, the plug 100 optionally can be firmly and securely joined with the remainder of the donor board, and nested in the donor board groove DBG. The bottom 100B of the plug can be integrally formed with the bottom B of the groove and the remainder of the board under the plug. Near the bottom, the plug can be tapered inward to a smaller dimension or diameter D2, but generally still connected to the donor board. As described herein, the tool 10 can be used to disassociate, dislodge, disconnect, break off and/or remove the plug from the donor board DB and from the donor board groove DBG if present. Alternatively, a screwdriver or other tool can be used to pop or remove the plug from the donor board DB and/or the donor board DB for retrieval by the tool 10.

Optionally, to use the tool 10 to remove the plug 100 from the donor board DB, a user can move the tool 10 close to the plug, so that the tube 30 surrounds or engages the plug, as shown in FIG. 3. After engaging the plug, so that the plug is generally within or installed relative to the tube 30, a user can tilt the tool in any of directions T1, T2, T3, etc. such that the tube axis TA of the tube becomes offset at an angle A1 relative to the plug longitudinal axis PLA (before the tool is installed relative to the plug). As mentioned above, this angle A1 optionally can be at least 1°, at least 2°, at least 3°, at least 4°, at least 5°, at least 10°, at least 20° or other angles. Further, as mentioned, the tube and handle can be rotated in direction R1 or tilted in directions T1, T2, T3, etc. about the plug longitudinal axis PLA in an effort to dislodge or disassociate the plug from the donor board DB. The user can rotate the tool in direction R1 or other directions opposite R1 while manipulating the plug 100 and eventually breaking it free from the donor board DB. As the plug is being tilted, rotated or wobbled within the donor board groove, the plug axis PLA can start to move with the tube, optionally aligned with the tube axis TA in so doing, and varying from the plug axis PLA shown in FIG. 3, which again, is the plug axis of the plug before being bent, broken or disassociated from the donor board DB as shown in that figure.

When the plug is broken free, the plug bottom 100B can break free from the donor board and dissociate from the surrounding bottom B of the donor board groove DBG. After this disassociation, the tube 30 can be removed within the tube 30 from the groove DBG and the remaining donor board hole DBH where the plug was previously located.

Further optionally, the exterior surface of the tube 30 can be engaged against a perimeter 107, perimeter edge 107E and/or groove sidewall of the donor board groove DBG. The perimeter 107, perimeter edge 107E and/or groove sidewall GS can serve as a bearing surface and/or fulcrum point for this leverage. The tube in this case can operate as a lever to pry the plug away from the groove bottom B and to separate the bottom 100B of the plug 100 from the donor board there. As a result, the tool and in particular the tube can be used to dislodge the plug from the remainder of the donor board. In some cases, the lower surface 22L of the handle can contact the board face DF, and operate to provide further leverage to lift, force and/or remove the plug from the donor board, and pry that plug out from the donor board groove DBG.

As mentioned above, the tool 10 can hold, retain and/or engage a plug via the tube 30 thereof. This can occur regardless of whether the plug was obtained from a pack of already formed plugs, or from a donor board as described above. With a plug 100 carried by the tool, the tool can be moved toward a recipient board RB, and in particular toward a hole 100H2, optionally disposed above a fastener 105 in the board RB. That fastener 105 can be installed relative to the board RB to secure the board RB to an underlying structure such as a joist 106 as shown in FIG. 4. The fastener 105 optionally can be pre-installed, and can have formed a portion of the hole 100H2 within which the plug is to be placed to conceal the fastener generally under the receiving board face RBF or within the board.

The tool 10 can be moved so that the tube 30 is aligned with the hole 100H2, and generally located above the hole. Where it is suitable to align the plug grain PG with the receiving board grain RG to provide a consistent and appealing aesthetic appearance of the board, and to better conceal the plug within the receiving board, certain steps can be taken. For example, a user can align the tool length axis TLA generally with the receiving board grain axis RBGA. Where the plug grain axis PGA of the plug grain PG was previously aligned with the tube length TL and/or tube length axis TLA of the tool 10, the user can be confident that the tube length TL and/or tube length axis TLA alignment with the receiving board grain axis RBGA will align the plug grain axis PGA of the plug grain PG with the receiving board grain axis RBGA. This can occur without the user removing the plug from the tube or tool to double check the orientation of the plug grain axis PGA, again because the plug grain axis PGA can be parallel to or generally aligned with the tube length axis TLA of the tool to provide a reference.

The user can insert the tube 30 into the hole 100H2 defined by the receiving board RB. In so doing, the lower portion 32 of the tube 30 can enter the hole 100H2. Optionally, the lower portion or edge 32 can engage the hole edge HE of the hole and can be frictionally pushed downward so that the exterior of the tube 30 further engages the hole sidewall HS of the hole 100H2. This can be done forcefully, or the tube can easily glide along the side wall or in some cases might not even engage the side wall. Generally, however, the tube 30 can engage the hole edge and/or hole sidewall. In some cases, the tube and the lower portion 32 can be aligned with the hole edge HE, with the lower portion 32 engaging that edge and resting or positioned atop the receiving board face RBF. In other cases, the tube can be inserted into the hole so that the lower portion or lower tube N32 of the tube 30 is located below the recipient board face RBF. In the above cases, the plug longitudinal axis PLA can be aligned with the hole axis 100H2A.

With the plug 100 generally aligned with the plug hole 100H2 via the tool, the plug 100 can be ejected from the tool, and in particular the tube 30, so that the plug can be installed relative to the hole 100H2. Optionally, the plug 100 can be ejected from the tube 30, with the plug bottom 100B passing by the hole edge HE and entering the hole. The plug sidewall 100S can engage the hole sidewall HS below the hole edge HE. In some cases, the plug side wall 100S also can engage at least partially the hole edge HE of the hole 100H2.

The ejecting of the plug from the tube can be facilitated via the ejector rod 40, for example, as shown in FIG. 5. In particular, the ejector rod can be actuated so that the lower end or lower portion of the ejector rod 42 engages the plug face 100PF and is moved downward. As this occurs, the plug moves outward from the tube 30 and is pressed, pushed, forced or otherwise enters the hole 100H2. Actuation and movement of the ejector rod 40 in direction M, to interface with the plug and eject it from the tube or otherwise install the plug 100 relative to the hole 100H2 can be affected via the ejector cap 28. In particular, a user can depress the cap 28 with a force TF, optionally exerted by the user's thumb, while the user grasps the remainder of the handle with their digits and palm. The force TF can be countered by a spring 27 as described above. The force TF can overcome the spring force, and due to the attachment of the cap 28 to the rod 40, the rod can move in direction M through the bore 20B of the tubular portion 20T of the handle 20. The lower end 42 of the rod can engage the plug and push it out from the tube and into the hole 100H2. A user also can exert a downward force DF on the handle 20 so that a lower surface 22L engages the receiving board face RBF to stabilize the tool relative to the receiving board RB. Of course, in other cases, the lower surface 22L might not engage or contact the receiving board face RBF.

As the plug 100 is ejected from the tube, optionally via the ejector rod 40, the plug side wall 100S can engage the hole sidewall HS and optionally the hole edge HE below the lower tube end 32 and below the lower end 42 of the rod 40. Further, the plug sidewall can engage the hole sidewall below the recipient board face RBF. The plug side wall and hole sidewall can frictionally engage one another, optionally at different points, depending on whether the plug is tapered or not. As the rod pushes the plug further into the hole, the friction between these components can increase and then assist in securing or holding the plug in the hole. As this occurs, the bottom 100B of the plug 100 also can move closer to the head 105F of the fastener 105. With the plug installed satisfactorily and/or fully into the hole 100H2, a user can remove the force TF from the rod 40. The rod and cap 28 can be returned to their original and previous configurations via the force generated by the spring 27. As mentioned above, the limiter 29 can limit the movement of the cap 28 relative to the handle.

The user can move the handle and tube 30 away from the plug. Due to the friction of the plug interacting with the hole, the surrounding hole edge HE and/or hole sidewall HS, the plug can remain in the hole. Of course, in some cases, the plug might just be loosely deposited in the hole, without any friction sufficiently holding it in place. In that state, the plug can be considered simply placed or deposited relative to the hole, ready for further action or installation of the plug in the hole.

Figure 6:
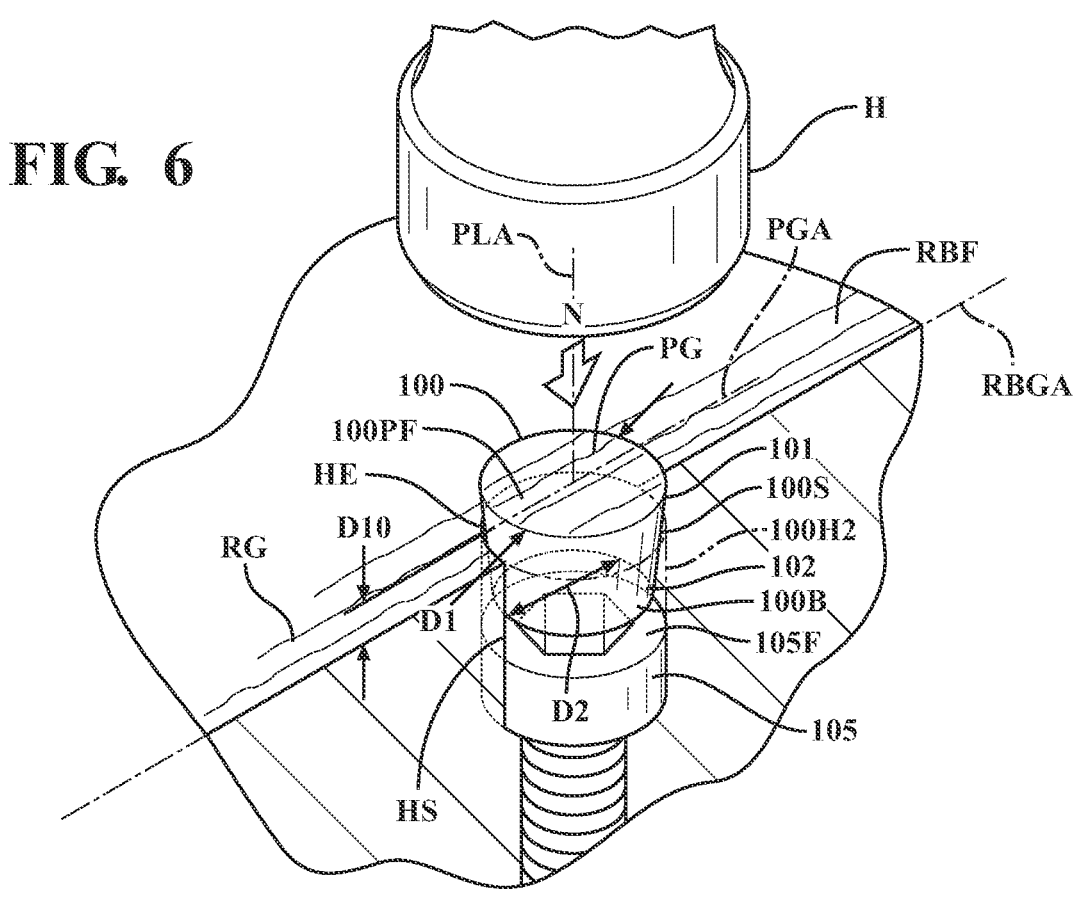
FIG. 6 is a side partial section view of the plug being further installed relative to the recipient board with a hammer.

As shown in FIG. 6, the plug 100 there can be installed at least partially in the plug hole 100H2. This installation can be accomplished via the tool 10 as described above. The plug grain PG in the plug grain axis PGA can be aligned with and/or parallel to the recipient board grain axis RBGA and generally can match the recipient grain RG. The plug face 100PF can be disposed a slight distance D10 above the recipient board face RBF. The plug bottom 100B can be disposed that distance or greater above the top of the fastener 105. With the plug only partially installed in this manner, a user can view the plug grain PG, and optionally compare it to the recipient board grain RG to confirm they are aligned. If not, the user can grasp the plug and rotate it about the plug longitudinal axis to align the plug grain and recipient board grain.

With the plug readied, to further install the plug 100, the user can take a tool, such as a hammer or other pounding device H and move it in direction N to strike the plug face 100PF, thereby driving the plug 100 farther into the hole 100H2. As this occurs, the plug grain PG remains aligned with the recipient board grain RG along with their respective axes. The plug sidewall 100S also engages the hole sidewall HS and optionally the hole edge HE as the plug is forced farther into the hole, with the bottom 100B approaching the head 105F of the fastener 105.

Figure 7:
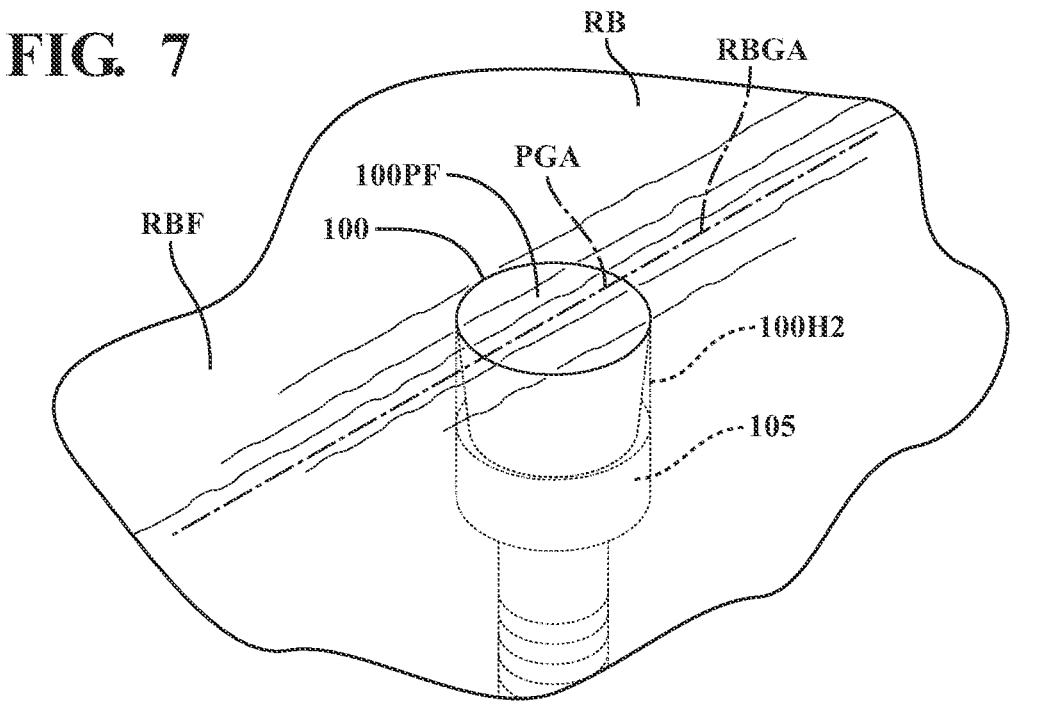
FIG. 7 is a side view of the plug installed and flush with the recipient board face.

Optionally, the plug can be tapped or pounded several times with the tool H until the plug is satisfactorily installed in the plug hole 100H2, over the fastener 105 as shown in FIG. 7. There, the plug face 100PF is flush with the receiving board face RBF of the receiving board RB. The plug grain axis PGA also is aligned with and/or parallel to the receiving board grain axis RGA. This can provide a clean and consistent aesthetic appearance of the recipient board face, with the plug face 100PF barely or not at all visible or distinguishable from the remainder of the recipient board face RBF.

Figure 8:
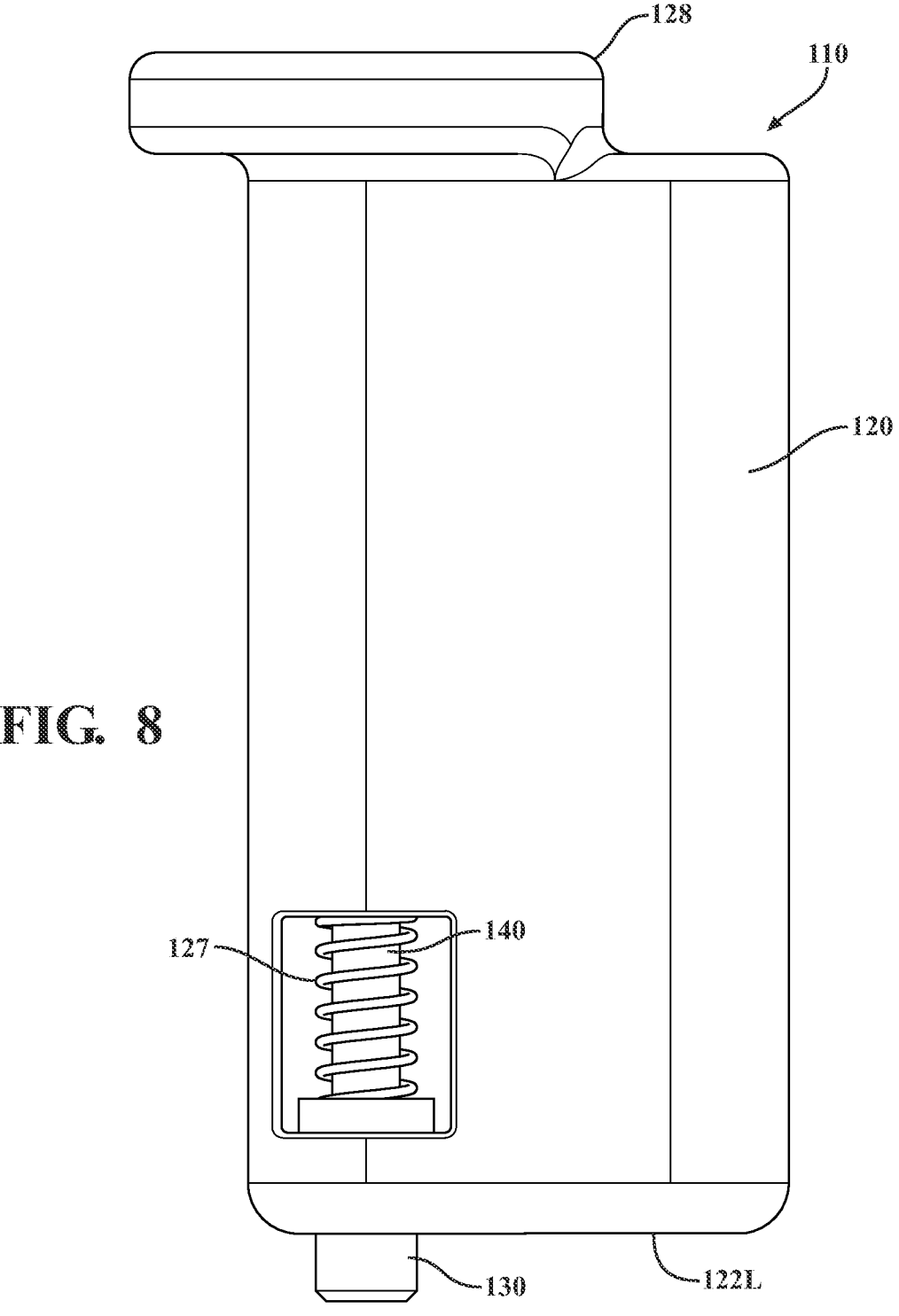
FIG. 8 is a perspective view of a first alternative embodiment of the plug tool.
Figure 9:
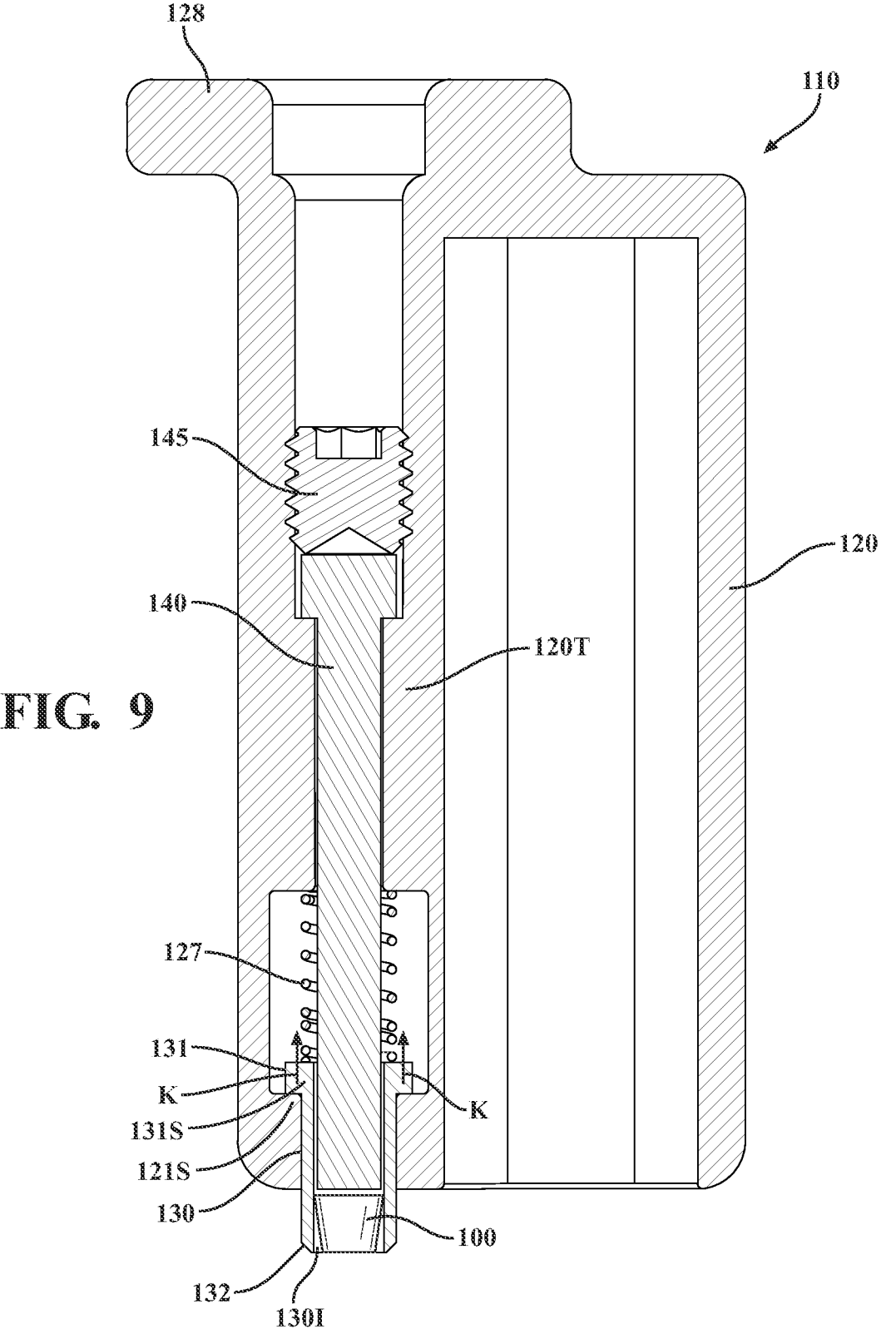
FIG. 9 is a section view of the plug tool installing the plug relative to a hole in a recipient board.
Figure 10:
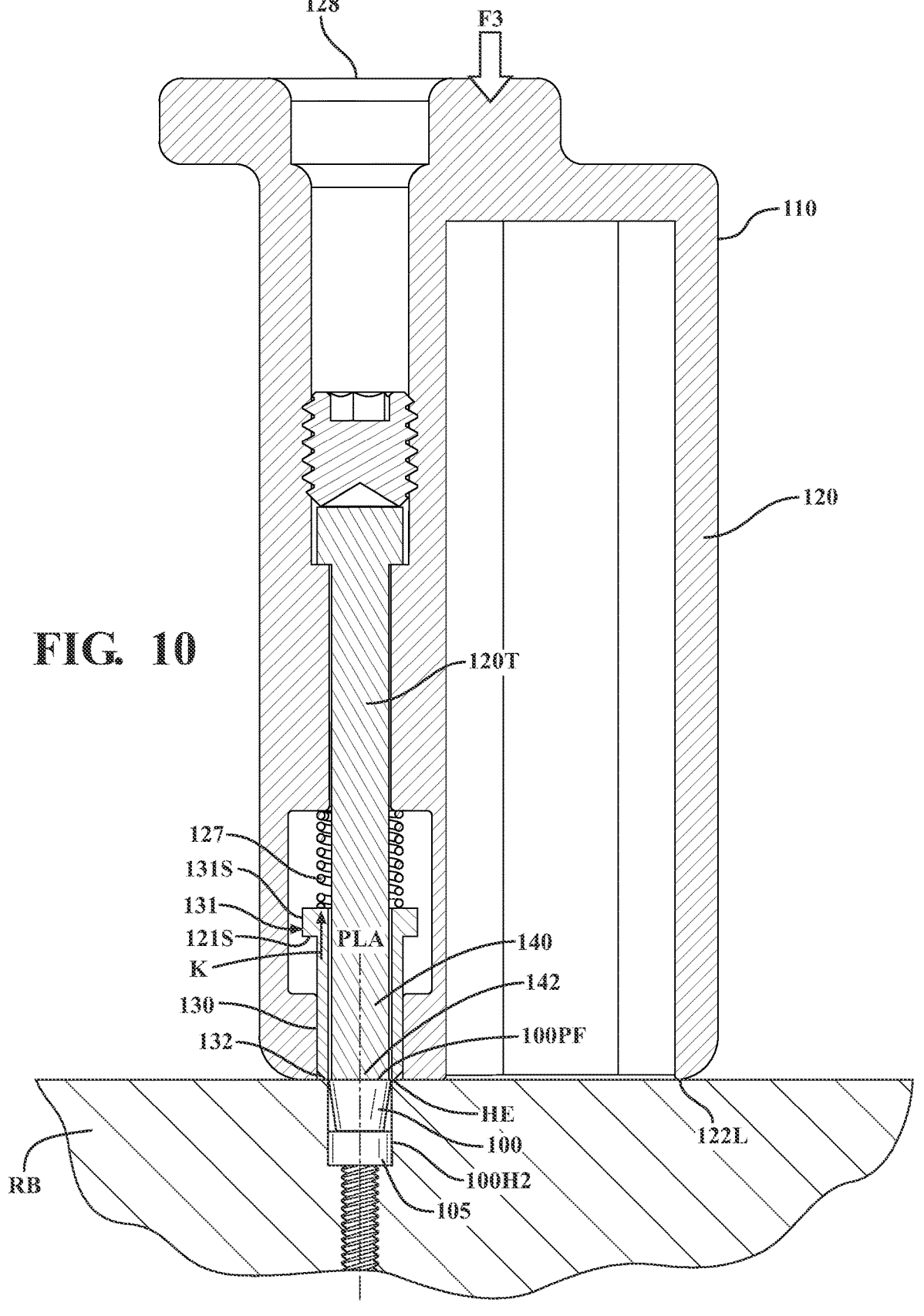
FIG. 10 is another section view of the plug tool installing the plug relative to a hole in a recipient board.
Figure 11:
FIG. 11 is a perspective view of a second alternative embodiment of the plug tool.

A first alternative embodiment of the plug tool is shown in FIGS. 8-10 and generally designated 110. This tool can be similar to the embodiment described above in structure, function and operation, with several exceptions. For example, this tool 110 can include a handle 120 that includes a cap 128, an ejector rod 140 and a tube 130. In this embodiment, however, the cap 128 can be stationary and unable to move the rod 140. The rod 140, in fact, can be secured in a fixed position within the tubular portion 120T, and generally immovable itself. Optionally, a set screw 145 or other fastener can engage with the rod 140 to hold it in a fixed position relative to the tubular portion 120 in the handle 120 and tool 110. More particularly, the rod 140 can be a fixed rod that is held stationary within the tool 110.

In this embodiment, however, the tube 130 can be movable in direction K as shown in FIG. 9 to effectively eject or allow a plug 100 to be removed from the interior 1301 of the tube 130. As shown there, the tube 130 can include a lower tube end 132 distal from an upper tube end 131. The upper tube end 131 can include a shoulder 131S that engages a corresponding shoulder 121S of the tubular portion 120T. The tube 120 can be aligned with rod 140 so that the rod 140 projects into the tube. The tube is movable in a direction K against an opposing force of a spring 127 when the tube is depressed against a surface. As a result, the tube 130 moves upward, so that the lower tube end 132 also moves upward, thereby exposing and allowing the plug 100 to be ejected or otherwise removed from the tube 130.

This is shown with further reference to FIG. 10. There, the tool 110 can be moved toward a receiving board RB. The lower tube end 132 of the tube 130 can engage the receiving board face RBF adjacent the hole edge HE of the hole 100H2. The plug 100 can at least partially enter the plug hole 100H2. As this occurs, the tube 130 retracts in direction K into the tubular portion 120T of the tool and handle 120. The spring 127 also can compress as the shoulder 131S pushes against it and away from the shoulder 121S. As the tube retracts into the handle, again, the rod can remain stationary. As a result, the lower end 142 of the rod effectively pushes against the plug 100, so that the rod drives the plug 100 into the hole 100H2 by applying a downward force F3 via the handle 120 of the tool. As a result, the plug 100 is installed in the hole 100H2 above the fastener 105. The plug face 100PF can be installed flush with the receiving board face RBF. Optionally, the respective grains of the plug and the receiving board can also be aligned as with the embodiments above. If suitable, the plug 100 can be further pounded or installed relative to the plug hole with another tool. After the tool 110 is removed, the spring 127 can extend the tube 130 relative to the lower surface 122L of the tool or handle 120 so that the tube 130 again attains the state shown in FIG. 8, readied for another plug to move and install.

A second alternative embodiment of the plug tool is shown in FIGS. 11-14 and generally designated 210. This tool can be similar to the first embodiment described above in structure, function and operation, with several exceptions. For example, this tool 210 can include a handle 220 that includes a cap 228, an ejector rod 240 and a tube 230. In this embodiment, however, the cap 228 and handle 220 can be smaller and more ergonomic. The cap 228 can be joined with a secondary rod 240S in the form of a fastener or screw that is threaded into and joined with the rod 240. The cap is thus connected to the rod 240 and can actuate it in the same manner as the current embodiment above to move the rod lower end 242 and eject the plug 100 from the tube as described in detail above.

Figure 12:
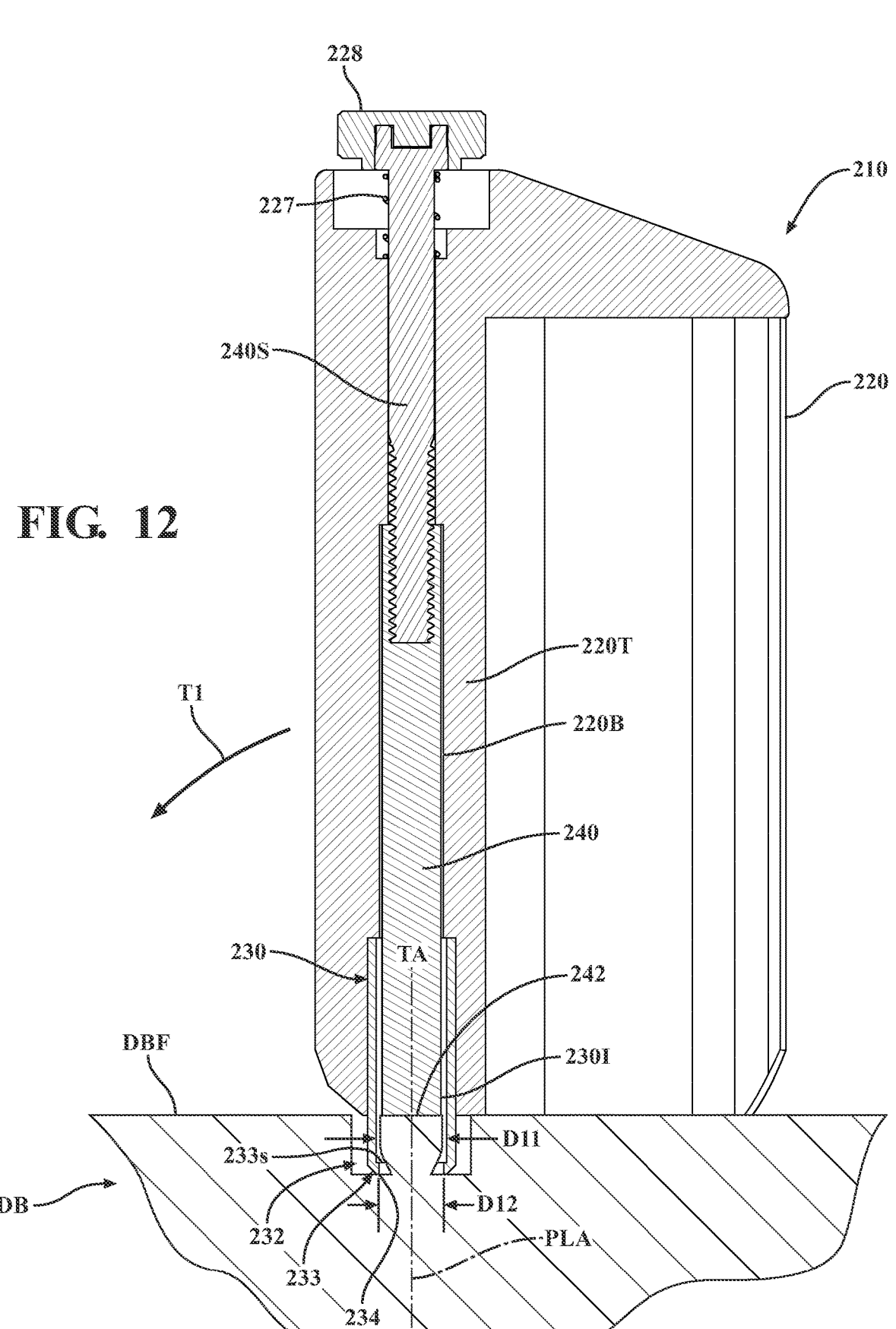
FIG. 12 is a section view of the plug tool initially engaging a plug to remove the plug from a donor board.
Figure 13:
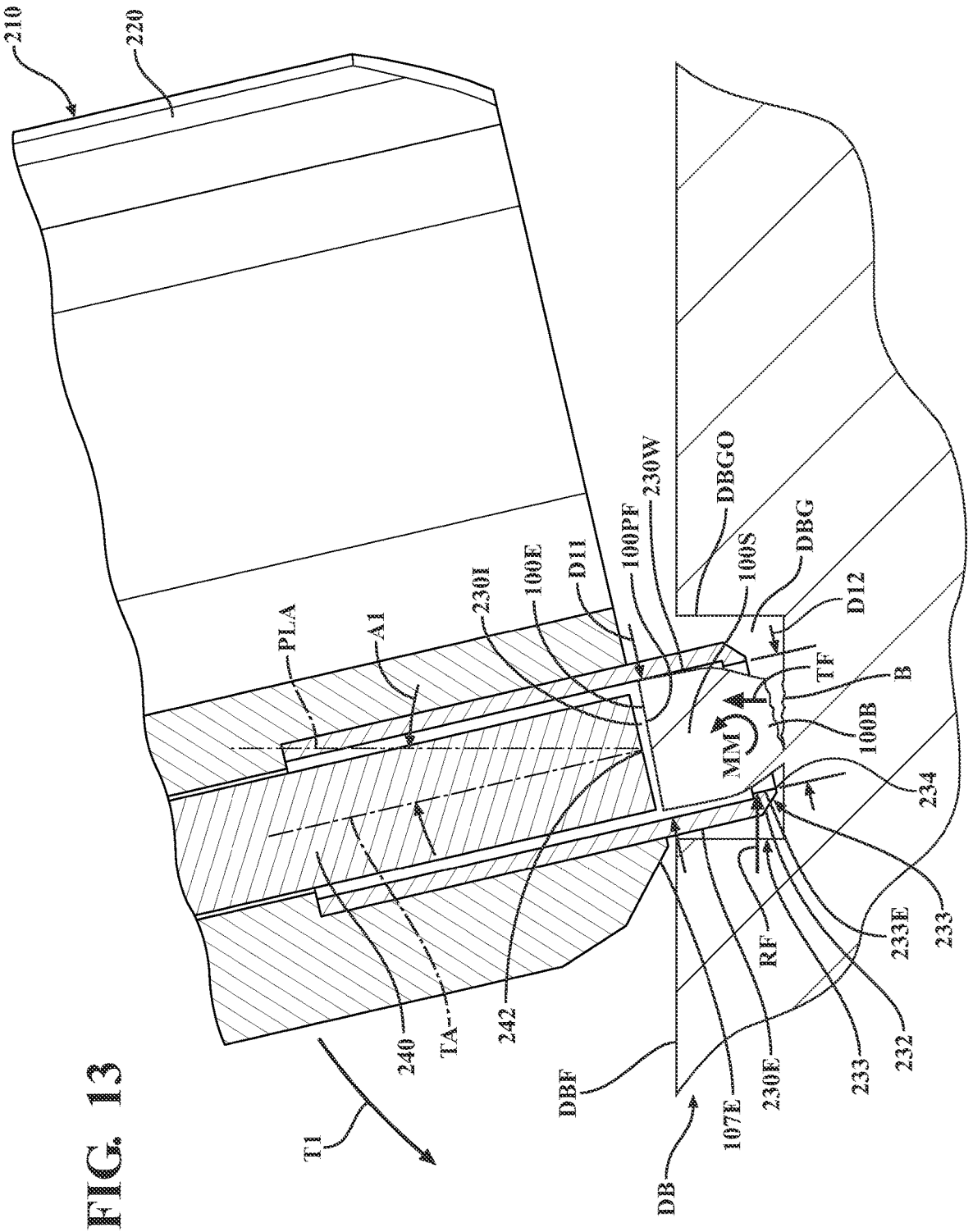
FIG. 13 is a section view of the plug tool being tilted to capture and disassociate the plug from the donor board.
Figure 14:
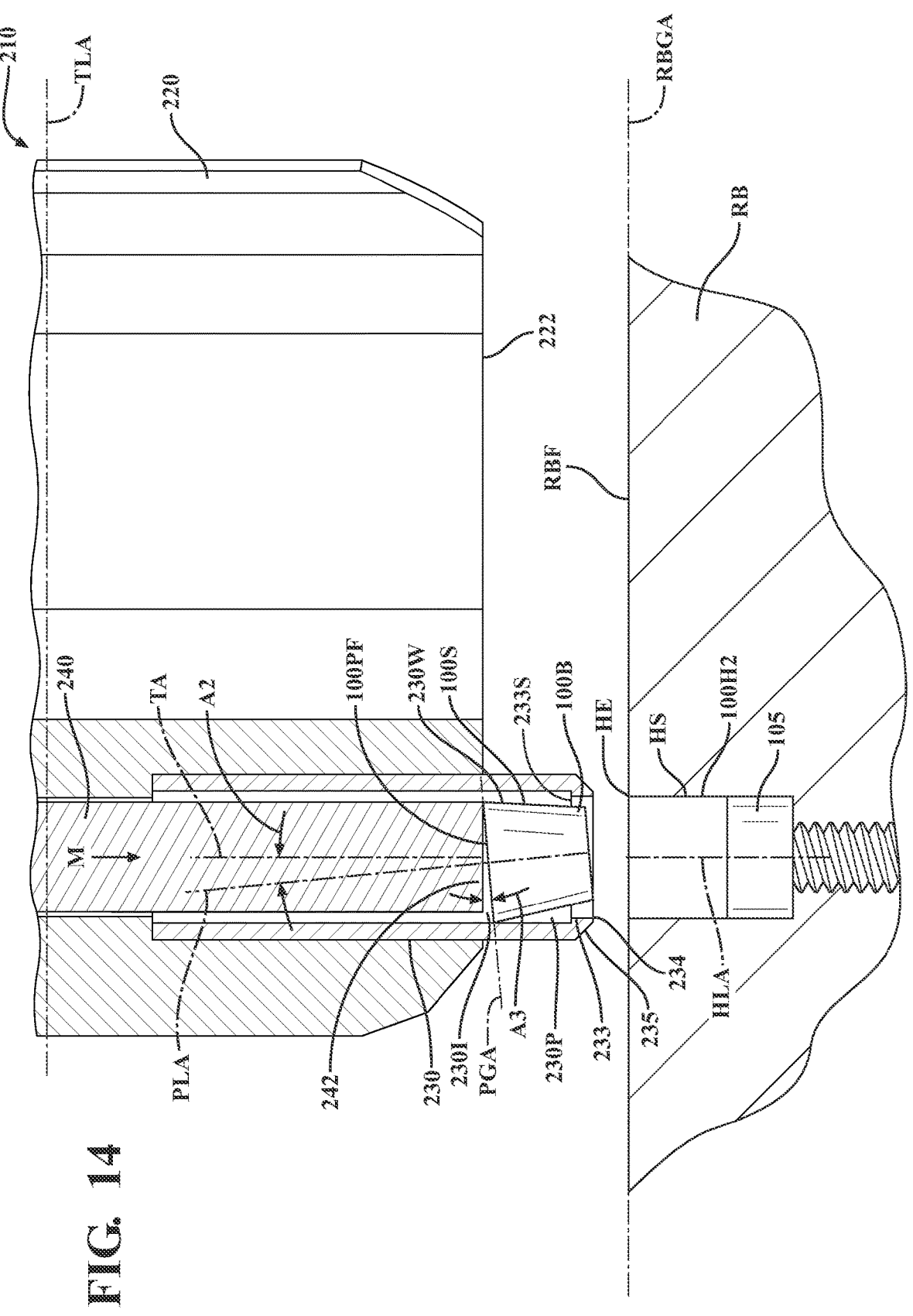
FIG. 14 is a section view of the plug tool being used to transport and install the plug relative to a hole in a recipient board.

In this embodiment, however, the tube 230 can have a tube interior 230I that is different from the interior 30I of the current embodiment, which interior 30I optionally was cylindrical and included a featureless sidewall. As shown in FIGS. 12 and 13, the interior 230I can be constructed to offer more structure to break off or disassociate a plug 100 from the donor board DB, and/or as shown in FIG. 14 to better secure or retain the plug 100 in the tube 230 during transport of the plug to a recipient board RB as described below. More particularly, the tube 230 can be constructed to include a rim or shoulder 233 that projects inward toward the tube axis TA. This rim 233 can be an annular, continuous rim as shown, circumscribing or surrounding the tube axis, or can be segmented into teeth or tabs that discontinuously surround the tube axis TA, projecting in at points or locations intermittently around that axis TA. The rim can include a lower cutting or prying edge 234 that forms a lowermost part of the rim or tube in general. This edge 234 can transition to the exterior of the tube at a beveled face 235 that provides the lower tube end 232 with a taper, such that the bevel tapers inward toward the tube axis TA as it extends closer to the lower cutting or prying edge 234. The bevel can transition upward to an optionally cylindrical outer surface 230E of the tube 230. Above the rim 233, opposite the prying edge can be a rim shoulder 233S. This shoulder can be located at a portion of the tube interior 230I where the dimension of the tube interior increases from a smaller diameter to a larger diameter.

With reference to FIGS. 12 and 13, the rim 233 extending inward can create different diameter opening or voids in the tube. At the rim 233, the tube can include a diameter D12. Above the rim, the tube can include a greater diameter D11. The difference in these diameters can produce at the rim a minor occlusion of the tube, which can better secure or hold a plug 100 in the tube, in the interior 230I, above that rim 233 during transport. Optionally, the interior sidewall 230S of the tube above the rim can be generally continuous and cylindrical. Further optionally, the different diameters also can enable the rim to set inward and engage the lower tapered part of the plug, to assist in snapping or breaking the plug bottom 100B from the donor board DB and out of the donor board groove DBG.

For example, as shown in FIGS. 12 and 13, when the tool is used to remove a plug 100 from the donor board DB, the tool 210 optionally can be tilted in direction T1. This moves the tube axis TA an angle A1 away from the illustrated in FIG. 13 as the original plug longitudinal axis PLA (before the tube was tilted, and the plug was securely and integrally formed with the remainder of the board DB). This angle A1 can be identical to the angles A1 identified in the current embodiment of the tool 10 above. As the tilting occurs, the exterior 230E of the tube engages the upper perimeter edge 107E of the donor board groove and/or the sidewall of that groove. This edge acts as a bearing surface and/or a fulcrum point so that the rim 233, and in particular, the rim interior edge 233E can engage and be forcefully pressed with force RF against the bottom 100B of the plug. As the force RF is applied, the upper edge 100E of the plug on the opposite side of the plug 100 is pressed against the interior wall 230W of the tube. Accordingly, this movement presses the rim interior edge 233E further against the plug bottom 100B to rotate the plug 100 and/or produce a moment MM on the plug. This further produces a tension force TF in the plug 100 at the bottom, and thus causes the plug bottom 100B to break off or disassociate from the bottom B of the groove or generally snap away from the donor board where the plug was previously attached thereto. The edge 233 also can move toward the opposing sidewall DBGO of the groove as this tilting occurs, which can further break off or disassociate the bottom 100B from the board to remove the plug. When it disassociates from the bottom, the plug bottom 100B optionally can be slightly rough or uneven, with small fibers, pieces or nodes projecting therefrom due to it having been broken from the donor board under tension forces. The plug bottom thus might not be perfectly flat, smooth or even, as would be the case with a premanufactured plug with which the plug tool also can be used.

When the plug 100 is disassociated from the donor board, the plug can come to rest in the tube interior 230I, optionally at least partially or wholly above the rim 233 in a plug receptacle above that rim. In this case, the plug bottom can rest against part of the rim, generally on the shoulder 233S atop the rim in the plug receptacle 230P as shown in FIG. 14. The plug also can be tilted slightly in the tube 230 so that the plug longitudinal axis PLA is offset at some angle A2 from the tube axis TA. This angle A2 optionally can be at least 1°, at least 2°, at least 3°, at least 4°, at least 5°, at least 10°, at least 20° or other angles depending on how the plug 100 rests inside the interior 230I of the tube. The plug can rest at this angle A2 while in the tube, and can be disposed in the increased, greater diameter interior portion or plug receptacle 230R of the tube adjacent the sidewall 230W, generally above the rim 233.

In this orientation and/or location above the rim, in the plug receptacle 230R, the plug 100 can be somewhat better secured in the tube for transport and relocation to a recipient board. The rim can operate to occlude the open lower end 232 of the tube, so that the plug is less prone to fall out from or exit the tube, even when the tube is held vertically with the tube axis TA being generally vertical as shown in FIG. 14. Optionally, the plug also can be wedge between the interior sidewall 230W of the tube and the rim 233 to assist in securing it within the tube. The plug 100 may or may not rest against or engage the rod lower end or face 242. All or a portion of the plug height can be disposed in the tube, optionally in the plug receptacle and above or at least engaging the rim 233 to better secure the plug in the tube during transport. In some cases, the plug face 100PF optionally can be angled at an offset angle A3, which can be equal to any of the angles A1 or A2 presented above, from the lower end or face 242 of the rod. The bottom of the plug also can be canted or tilted relative to the rim and the opening defined by the lower end 232 of the tube 230.

As shown in FIG. 14, the tool 210 and tube 230 can be moved toward the recipient board RB, with the tube generally aligned with the hole 100H2. The beveled face or edge 235 of the tube can be lowered and engaged with the perimeter or edge HE of the hole 100H2, similar to the embodiments above. The tube axis TA also can be aligned with the fastener or hole axis HLA as part of the process. Like the embodiments above the tube length axis TLA can be aligned by a user with the receiving board gran axis RBGA to align the plug grain axis PGA or some other feature on the plug face with that axis RBGA. When the tube lower portion is satisfactorily placed near, adjacent or against the hole edge and/or hole sidewall, the user can engage the cap 227 to move the rod 240 in direction M. This engages the lower rod face 242 with the plug face to push, press or generally move the plug out the lower tube end 232 and into the hole 100H2, like the embodiments above. The plug sidewall 100S can skim, slide or move along the rim 233 and out the opening of the tube. As this occurs, the rim 233 can engage the taper of the plug and right the plug so that the plug axis PLA is more aligned with the tube axis to provide a clean departure or ejection of the plug from the tube, more or less squared or aligned with the perimeter or edge 107E of the hole 100H2 so that the bottom or lower portion 100B of the plug easily enters the hole 102H2.

Like the embodiments above, the plug can be partially or wholly installed in the hole 100H2 of the recipient board with the tool 210. The tool 210 can be removed from the plug, with the tube likewise being disengaged from the plug. Where partially installed, the plug 100 can be oriented in the hole as shown in FIG. 6 in the embodiment above. Again, the plug grain PG can be aligned with the recipient board grain axis RBGA as described above, and the plug 100 can be tapped or pounded in place with a tool H as described in the embodiment above to fully install the plug in the recipient board, thereby plugging the hole and/or covering the fastener.

The following additional statements about other current embodiments are provided, the lettering of which is not to be construed as designating levels of importance.

Statement A. A plug moving tool comprising: an elongated handle including an upper portion and a lower portion; a tube extending from the lower portion, the tube sized to receive a plug therein; and an ejector rod aligned with the tube and configured to eject the plug when stored in the tube from the tube.

Statement B. The plug moving tool of Statement A, wherein the tube includes a lower tube end, wherein the lower tube end is beveled inward toward a tube axis.

Statement C. The plug moving tool of any preceding Statement, wherein the tube includes a lower portion, wherein the lower portion includes a rim extending radially inward toward the tube axis a distance.

Statement D. The plug moving tool of any preceding Statement, wherein the tube includes a tube interior above the rim, wherein the tube includes a first diameter at the rim, wherein the tube interior includes a second diameter in the tube interior above the rim, wherein the second diameter is greater than the first diameter.

Statement E. The plug moving tool of any preceding Statement, wherein the tube includes a prying edge disposed below a rim on the interior of the tube, wherein the prying edge is configured to pry against a bottom of the plug to create a moment in the plug and disassociate the plug from the donor board.

Statement F. The plug moving tool of any preceding Statement, wherein the tube includes a first dimension adjacent the lower tube end, and a second greater dimension above the lower tube end, wherein the second greater dimension forms a plug receptacle, wherein the plug receptacle retains the plug within the tube and is bounded by a rim.

Statement G. The plug moving tool of any preceding Statement, wherein the exterior of the tube can be forced against a hole edge of a donor board such that a prying edge of the tube adjacent the lower tube end forcefully engages a plug bottom to break the plug bottom from the donor board.

Statement H. The plug moving tool of any preceding Statement, wherein the prying edge transitions to an inwardly extending rim above the prying edge, wherein the tube forms a plug receptacle above the rim, wherein the plug comes to rest inside the plug receptacle after being disassociated from the donor board.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of moving a plug relative to a board, the method comprising:

providing a tool including an elongated handle, an upper portion and a lower portion with a tube extending from the lower portion;

placing the tube adjacent a plug having a plug face, a plug sidewall and a plug bottom such that the plug sidewall engages and is retained in the tube;

moving the tool so that the tube is aligned with a hole defined by a recipient board, the hole bounded by a hole sidewall, the hole being at least partially occupied by a head of a fastener securing the recipient board to a substrate; and ejecting the plug from the tube so that the plug sidewall engages the hole sidewall and is deposited in the plug hole of the recipient board.

2. The method of claim 1, comprising:

inserting the tube in the hole; and pushing the plug from the tube with a pusher so that the plug enters the hole.

3. The method of claim 1, wherein the recipient board includes a recipient board face, wherein the tube is inserted into the hole so that a lower tube end is located below the recipient board face, wherein the ejecting occurs so that the plug sidewall engages the hole sidewall below the lower tube end, and below the recipient board face.

4. The method of claim 3 comprising:

removing the tube from the plug and moving the tool away from the recipient board, wherein the plug face remains above the recipient board face.

5. The method of claim 4 comprising:

pounding the plug into the hole so that the plug face is flush with the recipient board face.

6. The method of claim 1 comprising:

moving a rod along a driving axis to eject the plug from the tube.

7. The method of claim 1 comprising:

providing the recipient board with a recipient board grain axis that is parallel to a board grain in the recipient board;

wherein the elongated handle includes a forward portion and a rearward portion separated by a tool length, wherein the elongated handle includes a first side and a second side separated by a tool width, wherein the upper portion is separated from the lower portion by a tool height, wherein the tool length is greater than the tool width.

8. The method of claim 7 comprising:

rotating the tool so that the tool length is oriented parallel to the board grain axis before the ejecting step.

9. The method of claim 1 comprising:

tilting the tube so that the plug bottom breaks loose from a donor board; and removing the plug from a donor hole having a diameter greater than a plug diameter of the plug at the plug face.

10. The method of claim 1 comprising:

installing the tube within a donor board groove defined by a donor board to circumscribe the plug with the tube.

11. A method of moving a plug relative to a board, the method comprising:

placing a tube of a tool over a plug having a plug face, a plug sidewall and a plug bottom such that the plug sidewall engages and is retained in the tube;

moving the tool so that the tube is aligned with a hole defined by a recipient board, the hole bounded by a hole sidewall; and ejecting the plug from the tube so that the plug sidewall engages the hole sidewall and is deposited in the plug hole to conceal a fastener securing the recipient board to a substrate.

12. The method of claim 11 comprising:

tilting the tube so that the plug bottom breaks loose from a donor board; and removing the plug from a donor hole defined by the donor board before moving the tool step.

13. The method of claim 12, wherein the donor board defines a donor board groove around the plug, wherein the tube is placed in the donor board groove, between the plug sidewall and a donor board groove sidewall before the tilting and removing steps.

14. The method of claim 12, comprising:

aligning a tool length axis with a grain axis of the donor board; and aligning the tool length axis with a grain axis of the recipient board before the ejecting step so that a plug face grain on the plug face is aligned with a recipient board grain on a recipient board face.

15. The method of claim 11 comprising:

inserting the tube in a donor board groove defined by a donor board to collect the plug from the donor board.

16. The method of claim 15 comprising:

moving a lower end of the tube below the plug face in the donor board groove.

17. The method of claim 11 comprising:

sliding a rod axially within the tube to engage the plug and eject the plug from the tube.

* * * * *